United States Patent
Ruuspakka et al.

(10) Patent No.: US 9,216,508 B2
(45) Date of Patent: Dec. 22, 2015

(54) CONNECTIVITY MAINTENANCE USING A QUALITY OF SERVICE-BASED ROBOT PATH PLANNING ALGORITHM

(71) Applicant: QUALCOMM Incorporated, San Diego, CA (US)

(72) Inventors: Roger M. Ruuspakka, San Diego, CA (US); Daniel Pickem, San Diego, CA (US); Padmapriya Jagannathan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 8 days.

(21) Appl. No.: 14/155,274

(22) Filed: Jan. 14, 2014

(65) Prior Publication Data

US 2015/0197010 A1  Jul. 16, 2015

(51) Int. Cl.
  *G06F 19/00* (2011.01)
  *B25J 9/16* (2006.01)
  *G05D 1/02* (2006.01)

(52) U.S. Cl.
  CPC .............. *B25J 9/1664* (2013.01); *G05D 1/028* (2013.01); *G05D 1/0285* (2013.01)

(58) Field of Classification Search
  CPC ....................................................... H04W 4/04
  See application file for complete search history.

(56) References Cited

U.S. PATENT DOCUMENTS

| | | | |
|---|---|---|---|
| 8,089,407 B2 * | 1/2012 | Chen et al. ..................... | 342/454 |
| 8,180,486 B2 * | 5/2012 | Saito et al. ..................... | 700/245 |
| 8,630,664 B2 * | 1/2014 | Alizadeh-Shabdiz et al. ........................... | 455/456.5 |
| 8,983,493 B2 * | 3/2015 | Brachet et al. ............. | 455/456.1 |
| 2007/0219667 A1 * | 9/2007 | Jung et al. ...................... | 700/245 |
| 2011/0093443 A1 * | 4/2011 | Alizadeh-Shabdiz et al. ............................ | 707/705 |
| 2013/0196684 A1 * | 8/2013 | Dong et al. ................ | 455/456.1 |

FOREIGN PATENT DOCUMENTS

JP         2004260769 A      9/2004

OTHER PUBLICATIONS

Falconi et al., "A Graph-Based Algorithm for Robotic MANETs Coordination in Disaster Areas", 8th IFAC Symposium on Fault Detection, Supervision and Safety of Technical Processes, Sep. 5, 2012, pp. 325-330, XP055185292, ISSN: 1474-6670, DOI: 10.3182/20120905-3-HR-2030.00037.
International Search Report and Written Opinion—PCT/US2015/011026—ISA/EPO—Apr. 27, 2015.

* cited by examiner

*Primary Examiner* — Bhavesh V Amin
(74) *Attorney, Agent, or Firm* — Loza & Loza LLP

(57) ABSTRACT

Methods, systems, and devices are described for evaluating signal quality metrics at one or more locations on one or more available paths to a target location by a robotic device, and determining a path to a target location and an access point switching plan for the robotic device based, at least in part, on evaluated metrics. In some examples, evaluating signal quality metrics may include comparing signal quality metrics associated with one or more locations to multiple signal quality thresholds, where one or more of these signal quality thresholds may include a minimum bandwidth threshold. In some examples, the access point switching plan comprises one or more switching events between multiple radio access technologies (RATs) at one or more boundaries. In some examples, determining a path or determining an access point switching plan is based, at least in part, on comparing the costs associated with usage of multiple RATs.

29 Claims, 12 Drawing Sheets

CONNECTIVITY MAINTENANCE USING A QUALITY OF SERVICE-BASED ROBOT PATH PLANNING ALGORITHM

BACKGROUND

The following relates generally to path planning, and more specifically to determining path plans and access point switching plans for robotic devices. Wireless communication systems are widely deployed to provide various types of communication content such as voice, data, and so on. These systems may be multiple-access systems capable of supporting communication with multiple devices by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Multiple-access wireless communication systems may include multiple geographically overlapping networks employing multiple radio access technologies (RATs).

Generally, a wireless multiple-access communications system may include a number of base stations, each simultaneously supporting communication for multiple robotic devices and providing network access to multiple local access points. Each base station and access point has a coverage range accessible to network-connected devices within the coverage range. In some settings, such as in indoor environments, for example, a WiFi network, or some other radio frequency network may be deployed throughout at least a portion of the indoor environment. In such a system, there may be multiple WiFi access points, placed at specific locations in the indoor environment. In addition, there may also be small cells deployed providing local access points to one or more multiple-access wireless communication systems.

It may be important for a mobile robotic device to maintain a defined level of network connectivity. For example, telepresence robots are typically dependent on a reliable network connection for the transmission and receipt of audio streams and video streams, and for the receipt of control signals from a remote operator. Loss of network connectivity may result in a loss of operator control over the robot, dropped audio or video transmissions, or delayed audio or video transmission. In the absence of network connectivity, these situations may be unrecoverable for certain robots and result in these robots requiring local assistance, special recovery programming, or both. Thus, it may be desirable to use improved methods and systems for path planning, access point switching planning, autonomous navigation, obstacle avoidance, self-localization, and the like.

SUMMARY

The described features generally relate to one or more methods, systems, and/or apparatuses for determining path plans and switching plans by a robotic device. More particularly, these path plans, switching plans, or both may include an assessment of signal quality such that they may be used as part of a pre-emptive connectivity-based planning approach for maintaining remote operator control, an autonomous robotic navigation capability for traversing areas below one or more connectivity thresholds, or both.

Methods, systems, and devices are described for evaluating signal quality metrics at one or more locations on one or more available paths to a target location by a robotic device, and determining a path to a target location and an access point switching plan for the robotic device based, at least in part, on evaluated metrics. In some examples, evaluating signal quality metrics may include comparing signal quality metrics associated with one or more locations to multiple signal quality thresholds. In some examples, an access point switching plan includes one or more switching events between multiple radio access technologies (RATs) at one or more switching boundaries. In some examples, determining a path or determining an access point switching plan is based, at least in part, on comparing the costs associated with usage of multiple RATs.

In some embodiments, a path planning method provides for planning a path of a robotic device, including evaluating signal quality metrics at one or more locations on one or more available paths to a target location for a robotic device, and determining a path to the target location and access point switching plan for the robotic device based, at least in part, on the evaluation of signal quality metrics. In some implementations, this evaluation includes comparing signal quality metrics associated with one or more locations to multiple signal quality thresholds. In certain implementations, path determination includes selecting the path with the lowest expected total cost where cost is, at least in part, a function of signal quality. In certain cases, determining the path includes identifying a path to a target location having one or more locations with a signal quality level below a minimum signal quality threshold, assigning a cost less than infinity to the identified locations, and selecting a path to the target location.

In some instances, a path planning method provides for planning a path of a robotic device, including evaluating signal quality metrics at one or more locations on one or more available paths to a target location for a robotic device, and determining a path to the target location and access point switching plan for the robotic device based, at least in part, on the evaluation of signal quality metrics. The access point switching plan may include one or more switching events at one or more locations wherein one or more switching events include disconnecting from one access point that uses a RAT and connecting to a different access point that uses a different RAT. In certain instances, path determination, access point switching plan determination, or both, may be based, at least in part, on comparing the cost associated with using one RAT to the cost associated with using a different RAT.

In some implementations, a path planning method provides for planning a path of a robotic device, including evaluating signal quality metrics at one or more locations on one or more available paths to a target location for a robotic device, and determining a path to the target location and access point switching plan for the robotic device based, at least in part, on the evaluation of signal quality metrics. Path determination, access point switching plan determination, or both may be based, at least in part, on maintaining a signal quality level in excess of one or more minimum signal quality thresholds. This may include maintaining a signal quality level in excess of a minimum signal quality threshold when using one RAT, and maintaining a signal quality level in excess of a different minimum signal quality threshold, when using a different RAT. In certain instances, at least one of the signal quality level thresholds includes a minimum bandwidth threshold.

In some embodiments, a path planning method provides for planning a path of a robotic device including evaluating signal quality metrics at one or more locations on one or more available paths to a target location for a robotic device, and determining a path to the target location and access point switching plan for the robotic device based, at least in part, on the evaluation of signal quality metrics. Determining the access point switching plan may include identifying an access point, that utilizes a RAT, identifying a coverage area sub-region for the access point where the expected signal quality level for the access point is below one or more signal quality threshold levels, selecting a different coverage area sub-region for a different access point with an expected signal quality level that exceeds one or more signal quality threshold levels where the different access point uses a different RAT, and selecting a switching boundary for establishing a connection with the different access point.

In some instances, a path planning method provides for planning a path of a robotic device, including evaluating signal quality metrics at one or more locations on one or more available paths to a target location for a robotic device, determining a path to the target location and access point switching plan for the robotic device based, at least in part, on the evaluation of signal quality metrics, evaluating the accuracy of one or more signal quality indicators of a signal quality map where determining the path plan is further based, at least in part, on the evaluated accuracy. This method may further include determining a signal quality level for a location on the signal quality map and updating the signal quality map with the determined signal quality level. Alternatively, or in addition, this method may include identifying a signal quality level at one or more locations, generating signal quality metrics based, at least in part, on the identified signal quality level, and updating the access point switching plan based, at least in part, on the generated signal quality metrics. In some instances, the path planning method may include determining a signal quality level for a location on the signal quality map and updating the signal quality map with the determined signal quality level.

In certain cases, a path planning method provides for planning a path of a robotic device, including evaluating signal quality metrics at one or more locations on one or more available paths to a target location for a robotic device, determining a path to the target location and access point switching plan for the robotic device based, at least in part, on the evaluation of signal quality metrics, identifying a signal quality level at one or more locations, generating signal quality metrics based, at least in part, on the identified signal quality level, and updating the access point switching plan based, at least in part, on the generated signal quality metrics.

In some embodiments, a path planning method provides for planning a path of a robotic device, including evaluating signal quality metrics at one or more locations on one or more available paths to a target location for a robotic device, determining a path to the target location and access point switching plan for the robotic device based, at least in part, on the evaluation of signal quality metrics, detecting a signal quality level at one or more locations where the detected signal quality level is different than an expected signal quality level for the one or more locations, transmitting the detected signal quality level to a remote computing device, and executing a local repair plan.

In some implementations, a path planning method provides for planning a path of a robotic device, including evaluating signal quality metrics at one or more locations on one or more available paths to a target location for a robotic device, and determining a path to the target location and access point switching plan for the robotic device based, at least in part, on the evaluation of signal quality metrics. In some instances, determining the access point switching plan includes referencing at least a portion of a navigation map where the navigation map is representative of robot-navigable regions, referencing at least a portion of an access point signal quality map representative of one or more access point signal quality coverage areas, referencing at least a portion of a different access point signal quality map representative of one or more additional access point signal quality coverage areas, aligning one or more of the access point signal quality coverage areas with at least a portion of the robot-navigable regions on the navigation map, and identifying one or more access point switching boundaries along the path to the target location. In some instances, one or more of the signal quality maps and navigation maps are stored on a remote computing device accessible to at least the robotic device. In some cases, at least one access point signal quality map is associated with an accuracy value, and determining the path includes calculating the lowest expected total cost where the lowest expected total cost calculation weights the signal quality level as a factor of total cost by converting the accuracy value to a signal quality level weighting factor, and selecting a path with the lowest expected total cost.

In some embodiments, a path planning device is configured for planning a path of a robotic device that includes at least one processor configured to evaluate signal quality metrics at one or more locations on one or more available paths to a target location for a robotic device, and determine a path to a target location and access point switching plan for the robotic device based, at least in part, on the evaluated signal quality metrics. In certain instances, the determined access point switching plan includes one or more switching events at one or more switching boundaries where one or more switching events includes a disconnect event from an access point that uses one RAT and a connect event to a different access point that uses a different RAT.

In some instances, a path planning device is configured for planning a path of a robotic device that includes at least one processor configured to evaluate signal quality metrics at one or more locations on one or more available paths to a target location for a robotic device, and determine a path to a target location and access point switching plan for the robotic device based, at least in part, on the evaluated signal quality metrics, and compare the cost associated with using of one RAT to the cost associated with using a different RAT. Alternatively, or in addition, the processor may be configured to maintain a signal quality level in excess of a minimum signal quality threshold when using one RAT, and to maintain a signal quality level in excess of a different minimum signal quality threshold when using a different RAT.

In some embodiments, a path planning device is configured for planning a path of a robotic device that includes at least one processor configured to evaluate signal quality metrics at one or more locations on one or more available paths to a target location for a robotic device, determine a path to a target location and access point switching plan for the robotic device based, at least in part, on the evaluated signal quality metrics, and compare signal quality metrics associated with one or more locations to multiple signal quality thresholds.

In some implementations, a path planning device is configured for planning a path of a robotic device that includes at least one processor configured to evaluate signal quality metrics at one or more locations on one or more available paths to a target location for a robotic device, determine a path to a target location and access point switching plan for the robotic device based, at least in part, on the evaluated signal quality metrics, detect a signal quality level at one or more locations, generate signal quality metrics based, at least in part, on the detected signal quality, and update the access point switching plan based, at least in part, on the signal quality metrics.

In certain embodiments, a path planning system includes means for evaluating signal quality metrics at one or more locations on one or more available paths to a target location for a robotic device, and means for determining a path to a target location and an access point switching plan for the robotic device based, at least in part, on the evaluation of signal quality metrics. In certain instances, the path planning system includes means for detecting a signal quality level at one or more locations, means for generating signal quality metrics based, at least in part, on the detected signal quality level, and means for updating the access point switching plan based, at least in part, on the signal quality metric.

In some implementations, a path planning system includes means for evaluating signal quality metrics at one or more locations on one or more available paths to a target location for a robotic device, means for determining a path to a target location and an access point switching plan for the robotic device based, at least in part, on the evaluation of signal quality metrics. The access point switching plan may include one or more switching events at one or more boundaries where one or more switching events include means for disconnecting from an access point using one RAT and means for connecting to a different access point using a different RAT.

In some instances, a path planning system includes means for evaluating signal quality metrics at one or more locations on one or more available paths to a target location for a robotic device, and means for determining a path to a target location and an access point switching plan for the robotic device based, at least in part, on the evaluation of signal quality metrics. In some implementations, means for determining the path to the target location, means for determining the access point switching plan, or both are based, at least in part, on comparing the cost associated with using a RAT to the cost associated with using a different RAT. In certain instances, means for determining the path to the target location, means for determining the access point switching plan, or both are based, at least in part, on maintaining a signal quality level in excess of a minimum signal quality threshold when using a RAT and maintaining a signal quality level in excess of a different minimum signal quality threshold, when using a different RAT.

In certain embodiments, a path planning system includes a means for evaluating signal quality metrics at one or more locations on one or more available paths to a target location for a robotic device, and a means for determining a path to a target location and an access point switching plan for the robotic device based, at least in part, on the evaluation of signal quality metrics. In some instances, means for evaluating signal quality metrics includes means for comparing signal quality metrics associated with one or more locations to multiple signal quality thresholds.

In some embodiments, a computer program product for a path planning system with a non-transitory computer-readable medium includes code for evaluating signal quality metrics at one or more locations on one or more available paths to a target location for a robotic device, and code for determining a path to a target location and access point switching plan for the robotic device based, at least in part, on the evaluation of signal quality metrics. In certain instances, the computer program product includes code for detecting a signal quality level at one or more locations, code for generating signal quality metrics based, at least in part, on the detected signal quality level, and code for updating the access point switching plan based, at least in part, on the signal quality metric.

In some instances, a computer program product for a path planning system with a non-transitory computer-readable medium includes code for evaluating signal quality metrics at one or more locations on one or more available paths to a target location for a robotic device, code for determining a path to a target location and an access point switching plan for the robotic device based, at least in part, on the evaluation of signal quality metrics. The determined access point switching plan may include one or more switching events at one or more boundaries where one or more switching events include means for disconnecting from an access point that uses a RAT and means for connecting to a different access point that uses a different RAT.

In some implementations, a computer program product for a path planning system with a non-transitory computer-readable medium includes code for evaluating signal quality metrics at one or more locations on one or more available paths to a target location for a robotic device, code for determining a path to a target location and an access point switching plan for the robotic device based, at least in part, on the evaluation of signal quality metrics. In some implementations, code for determining the path to the target location, code for determining the access point switching plan, or both are based, at least in part, on comparing the cost associated with using a RAT to the cost associated with using a different RAT. In certain instances, code for determining the path to the target location, code for determining the access point switching plan, or both are based, at least in part, on maintaining a signal quality level in excess of a minimum signal quality threshold when using a RAT and maintaining a signal quality level in excess of a different minimum signal quality threshold, when using a different RAT.

In some embodiments, a computer program product for a path planning system with a non-transitory computer-readable medium includes code for evaluating signal quality metrics at one or more locations on one or more available paths to a target location for a robotic device, code for determining a path to a target location and an access point switching plan for the robotic device based, at least in part, on the evaluation of signal quality metrics. In some instances, the code for evaluating signal quality metrics includes code for comparing signal quality metrics associated with one or more locations to multiple signal quality thresholds.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
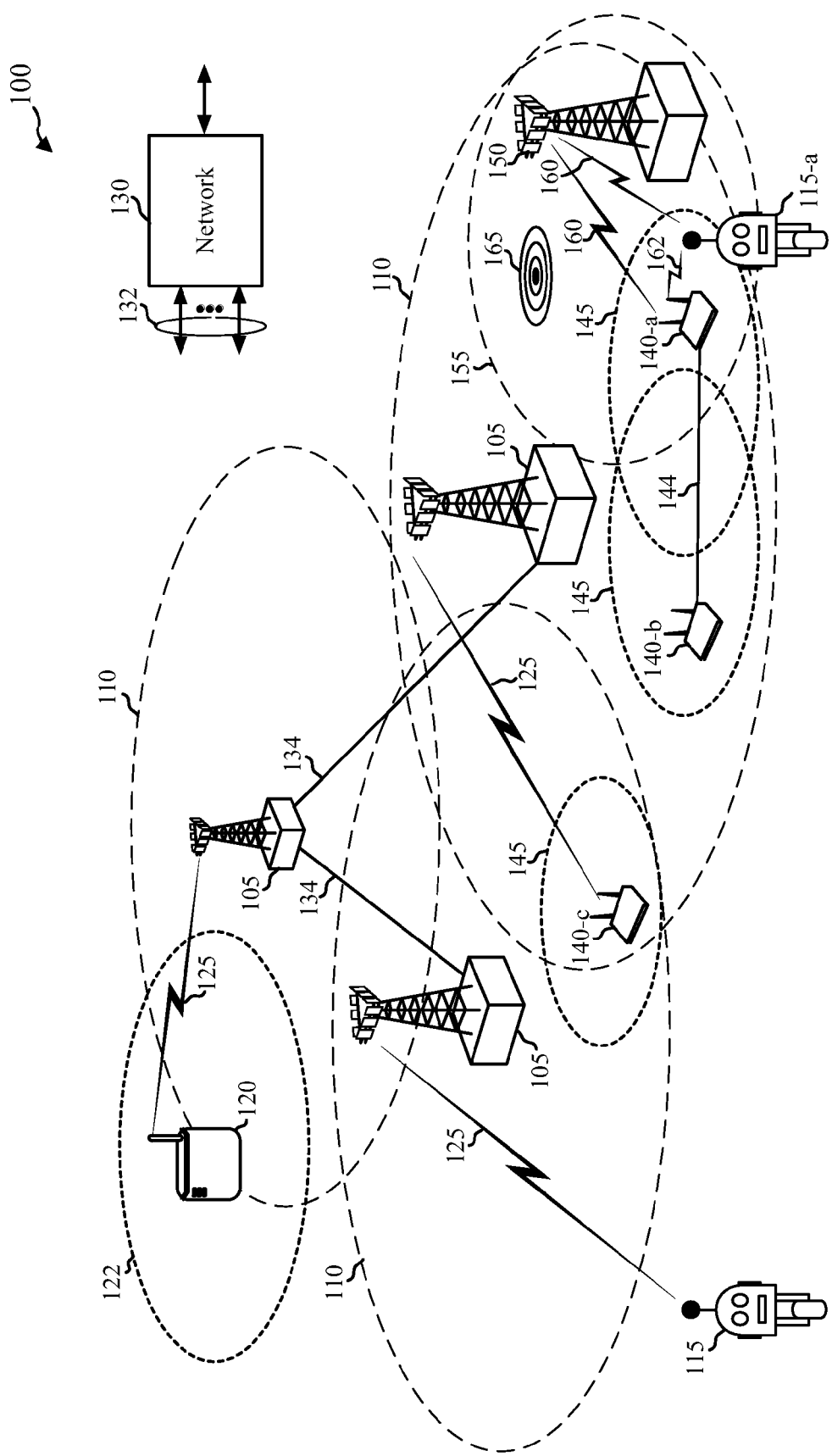
FIG. 1 shows a block diagram of a wireless communications system and coverage areas.

The following description generally relates to methods, systems, and devices for evaluating signal quality metrics, and determining a path to a target location and an access point switching plan for a robotic device. In some embodiments, signal quality is evaluated for multiple access point coverage area sub-regions along various robot-navigable paths to a target location. A signal quality map may be generated where cost metrics are associated with each access point and access point coverage area sub-region. Available paths may be determined based on an assessment of one or more portions of a robot navigation map, then costs attributed to each path based on, for example, distance, pedestrian traffic, obstacle volume, width of passage areas, and the like.

The signal quality map may be aligned with the robot navigation map such that associated signal costs and access point switching costs can be incorporated into a cost-based path selection algorithm. Associated signal costs may include, for example, signal strength, signal reliability, signal bandwidth, and network usage charges. A path plan and associated access point switching plan may then be selected based on the results of a weighted cost comparison function reflecting user preferences, one or more minimum threshold levels, or map accuracy.

For example, a quality of service-based robot path planning and access point switching selection method may be used to ensure that a minimum quality of service network connection is maintained as a robot traverses a path to a target location. The method may, for example, align or associate access point signal strength at each position on a signal map, with a robot navigation map, such as a simultaneous localization and mapping map (SLAM), using the resulting alignment or association to minimize entry into areas where the signal strength is below a minimum signal strength threshold. Further the association or alignment may be used to generate possible switching plans and to assign cost metrics to those plans. The costs associated with a particular switching events at given switching boundaries may be included as a cost in the cost metrics for a particular path. Alternatively, the initial path cost calculation may be performed without accounting for the costs associated with various switching plans. In this case, one or more switching plans may then be calculated subsequent to path selection. The cost of the available path plans may then be updated to reflect the cost of associated switching plans.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes base stations (or cells) 105, 150, robotic devices 115, a target location and a network 130. The base stations 105, 150 may communicate with the robotic devices 115 under the control of a base station controller (not shown), which may be part of the network 130 or the base stations 105, 150 in various embodiments. Base stations 105 may communicate control information and/or user data with the network 130 through backhaul links 132. Backhaul links may be wired backhaul links (e.g., copper, fiber, etc.) and/or wireless backhaul links (e.g., microwave, etc.). In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125, 160 may be a multi-carrier signal modulated according to the various radio technologies described above. Each modulated signal may be sent on a different carrier and may carry control information (e.g., reference signals, control channels, etc.), overhead information, data, etc.

The base stations 105, 150 may wirelessly communicate with the robotic devices 115 via one or more base station antennas. Each of the base station 105, 150 sites may provide communication coverage for a respective geographic area 110, 155. In some embodiments, base stations 105, 150 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110, 155 for a base station may be divided into sectors making up only a portion of the coverage area (not shown). The system 100 may include base stations 105, 150 of different types (e.g., macro, micro, and/or pico base stations). There may be overlapping coverage areas for different technologies.

One or more robotic devices 115 may be dispersed throughout the wireless network 100, and each device may be stationary or mobile. A robotic device 115 may be able to communicate with macro base stations, pico base stations, small cell base stations, relay base stations, and the like, and may also support communications on multiple different RATs, such as different cellular/wireless wide area network (WWAN) and WiFi/wireless local area network (WLAN) RATs, for example.

The transmission links 125, 160 shown in network 100 may include uplink (UL) transmissions from a robotic device 115 to a base station 105, 150, and/or downlink (DL) transmissions, from a base station 105, 150 to a robotic device 115. The downlink transmissions may also be called forward link transmissions while the uplink transmissions may also be called reverse link transmissions. In embodiments, the transmission links 125, 160 may be FDD or TDD carriers carrying bidirectional traffic within traffic frames. Data traffic may be transmitted between base station 105, 150 and robotic device 115.

In some embodiments, the system 100 is an LTE/LTE-A network. In LTE/LTE-A networks, the terms evolved Node B (eNB) and robotic equipment (RE) may be generally used to describe the base stations 105, 150 and robotic devices 115, respectively. The system 100 may be a Heterogeneous LTE/LTE-A network in which different types of eNBs provide coverage for various geographical regions. For example, each eNB 105, 150 may provide communication coverage for a macro cell, a pico cell, a small cell, and/or other types of cell. A macro cell generally covers a relatively large geographic area (e.g., several kilometers in radius) and may allow unrestricted access by REs with service subscriptions with the network provider. A pico cell would generally cover a relatively smaller geographic area and may allow unrestricted access by REs with service subscriptions with the network provider. A small cell would also generally cover a relatively small geographic area (e.g., a home) and, in addition to unrestricted access, may also provide restricted access by REs having an association with the small cell (e.g., REs in a closed subscriber group (CSG), REs for users in the home, and the like). An eNB for a macro cell may be referred to as a macro eNB. An eNB for a pico cell may be referred to as a pico eNB. And, an eNB for a small cell may be referred to as a small eNB, a femto eNB or a home eNB. An eNB may support one or multiple (e.g., two, three, four, and the like) cells.

The communications system 100 according to an LTE/LTE-A network architecture may be referred to as an Evolved Packet System (EPS) 100. The EPS 100 may include one or more REs 115, an Evolved UMTS Terrestrial Radio Access Network (E-UTRAN), an Evolved Packet Core (EPC) (e.g., network 130), a Home Subscriber Server (HSS), and an Operator's IP Services. The EPS may interconnect with other access networks using other RATs. For example, system 100 may interconnect with a UTRAN-based network and/or a CDMA-based network via one or more Serving GPRS Support Nodes (SGSNs). For example, robotic device 115-*a* may be within overlapping coverage areas of a base station 105 of an E-UTRAN, a node-B 150 of a CDMA-based network, and a WiFi/WLAN access point 140-*a*. Transmission links 160 and 162 may connect the robotic device 115-*a* with WiFi/WLAN access point 140-*a* and Node B 150, respectively. According to some embodiments, the robotic device 115-*a* may include access point selection plans that may be selectively applied to determine when the robotic device 115-*a* connects to the system via base station 105, Node B 150, or WiFi/WLAN access point 140, and when the robotic devices switches from one access point to another. Such a determination, as will be described in more detail below, may be based on signal costs and switching costs associated with each respective network that may be determined by robotic device 115-*a* and/or reported to the robotic device 115-*a* by the respective network or by a remote computing device connected to the respective network. To support mobility of REs 115 and/or load balancing, system 100 may support handover of robotic devices 115 between a source base station 105 and a target base station 105. According to some embodiments, system may also support intra-RAT handover between base stations of the same RAT (e.g., other E-UTRAN networks), and inter-RAT handovers between Node Bs, base stations, and/or network access points of different RATs (e.g., E-UTRAN to CDMA or WLAN, etc.). The system 100 may provide packet-switched services, however, as those skilled in the art will readily appreciate, the various concepts presented throughout this disclosure may be extended to networks providing circuit-switched services.

Figure 2:
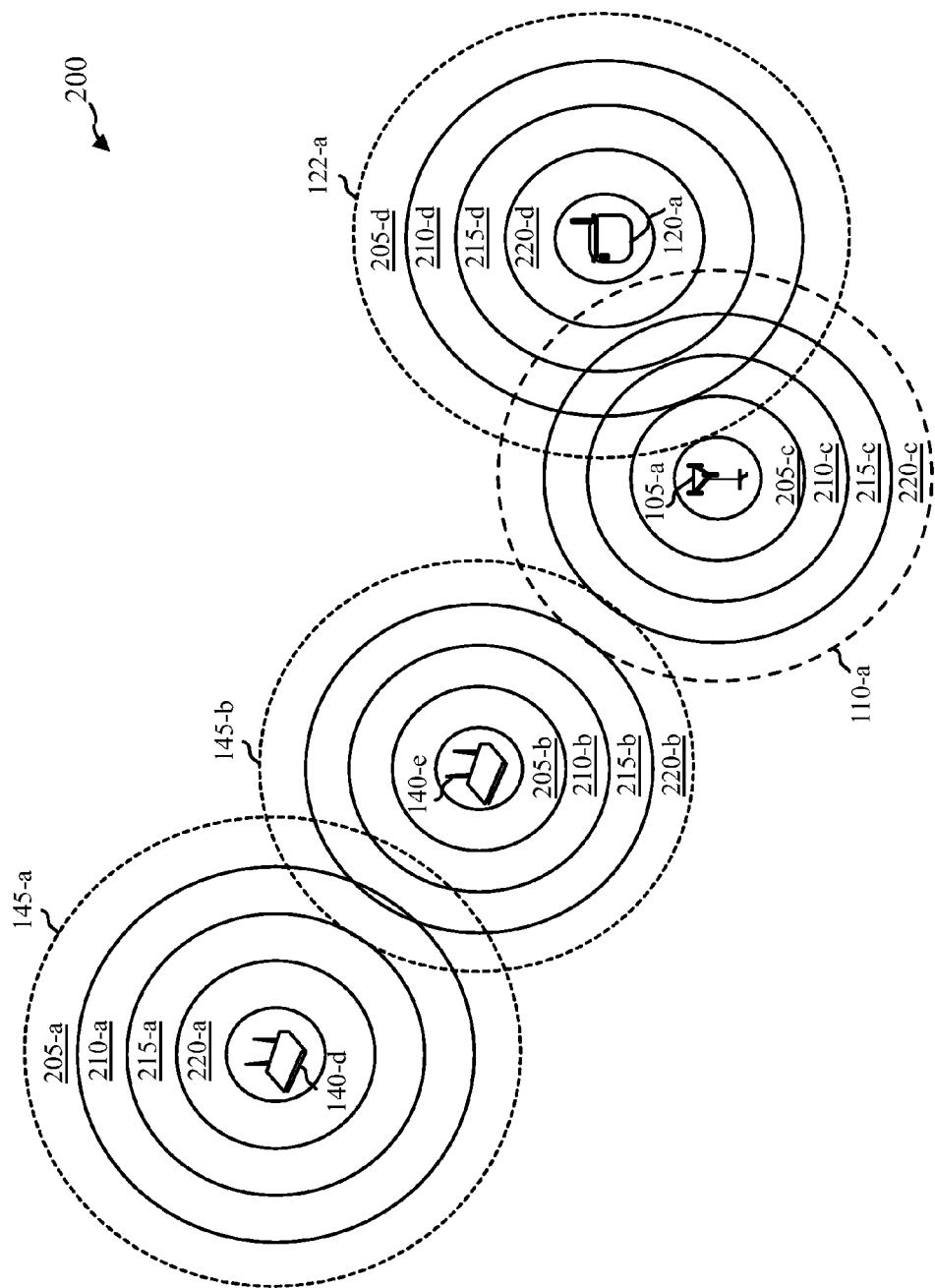
FIG. 2 shows a block diagram of a signal quality map for a series of access points and coverage areas.

FIG. 2 is a block diagram illustrating a signal quality map for a series of access points and related coverage areas in accordance with various embodiments, and may be a representation of a signal quality map for a system that forms at least a part of the system 100 of FIG. 1. A signal quality map may be created that represents the signal quality for one or more access points 140-*d*, 140-*e*, 105-*a*, 120-*a*. Each access point may have a coverage area 145-*a*, 145-*b*, 110-*a*, 122-*a* within which robotic devices 115 (e.g. see FIG. 1) may connect to the network associated with the access point 140-*d*, 140-*e*, 105-*a*, 120-*a*. Within a given coverage area, 145-*a*, 145-*b*, 110-*a*, 122-*a*, there may be one or more coverage area sub-regions 205, 210, 215, 220. Coverage area sub-regions 205, 210, 215, 220 may differ with respect to one or more attributes used in signal quality calculations such as, for example, signal intensity, signal reliability, estimated bandwidth, historical bandwidth, and the like. In certain instances, coverage area sub-regions 205, 210, 215, 220 associated with different access points 140-*d*, 140-*e*, 105-*a*, 120-*a* may overlap such that a robotic device 115 may be able to connect to more than one access point at a given location.

In some embodiments signal quality maps 200 may be assigned an accuracy value indicating the expected accuracy of the data included and associated with the signal quality map 200. For example, accuracy values may be associated with each individual measurement, indicating such information as the age of the measurement taken, the sensor reliability of the sensor obtaining measurements, the past sensor performance of the sensor obtaining measurements, and the so on. In certain instances, each access point 140-*d*, 140-*e*, 105-*a*, 120-*a* may have an individual accuracy value assigned, which may be used to determine, in part, a weight for determining path plans and access point switching plans. In some implementations, accuracy values may be assigned to each measurement obtained.

In some embodiments, one or more minimum threshold values correspond to a coverage area sub-region boundary. For example, a minimum signal intensity threshold, a minimum bandwidth threshold, or both may define the coverage area sub-region boundary where a switching event would occur such that a minimum signal quality level is maintained. The one or more thresholds that may be included in a minimum signal quality threshold may be determined by, for example, user preference, data transmission demands such as audio and video streaming, control prioritization such as might exist for mission critical activities, and the like.

Figure 3:
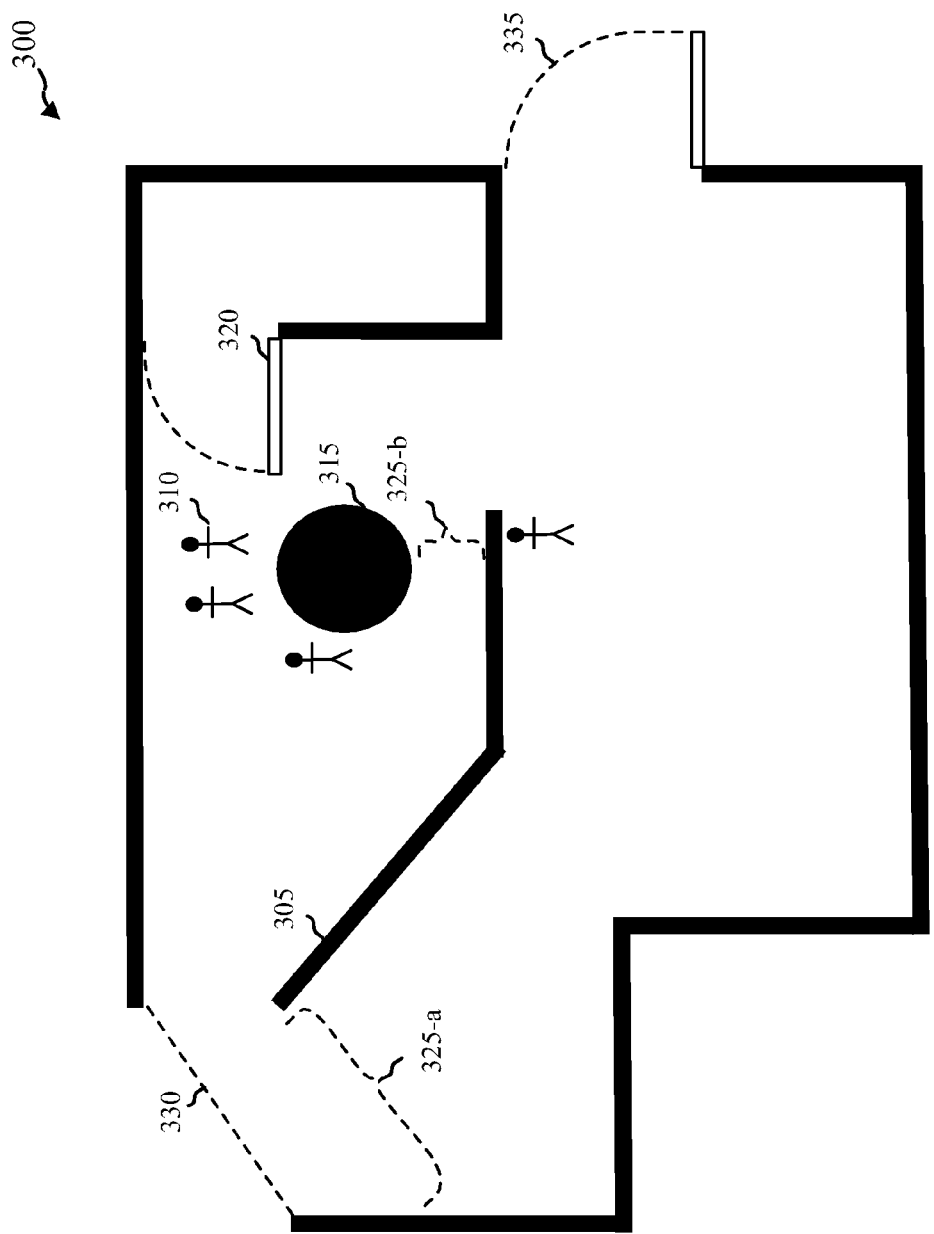
FIG. 3 shows a plan view of a robot navigation map for a portion of the coverage area of the signal quality map of FIG. 2.

FIG. 3 shows a plan view of a robot navigation map 300 for a portion of the coverage area of the signal quality map of FIG. 2 in accordance with various embodiments. In some embodiments, the navigation map is be used by the robotic device to determine, in part, the robot location within the environment represented by the map, and to depict robot-navigable regions in the environment for path planning purposes. Navigation maps may support the assessment of robot device location by recording information obtained from one or more sensors and comparing this information to a current set of sensed data associated with the robotic device. Navigation maps generally represent a state at the time that the map is drawn, and may provide information relating to such physical attributes as, for example, topography (not shown), obstacles 315, pedestrian traffic 310, distance between obstacles 325, entry ways 330, exits 335, architectural attributes such as, for example, walls 305 and doors 320, and the like. In certain instances, the navigation map provides information used to determine the available paths in the path planning and access point switching planning process. In some embodiments, navigation maps may be retrieved by the robotic device 115-a (e.g. see FIG. 1) from a remote computing device, transmitted to a remote computing device, or shared with other robotic devices 115.

Robotic devices, in some implementations use cost-based path planning algorithms, such as the A* algorithm, to evaluate path-related attributes included in the navigation map and select a path. In some cases, the path selection algorithm is based solely on determining the path with the shortest distance from an initial location to a target location. For example, path planning using algorithms such as the A* algorithm may determine a path based on how costly it is to execute an action or a motion. The cost of a motion may be 1, meaning that all actions have the same cost. A robotic path planning algorithm may, in certain instances, consider only available motions, meaning motions that will direct the robot into an obstacle are discarded.

Figure 4:
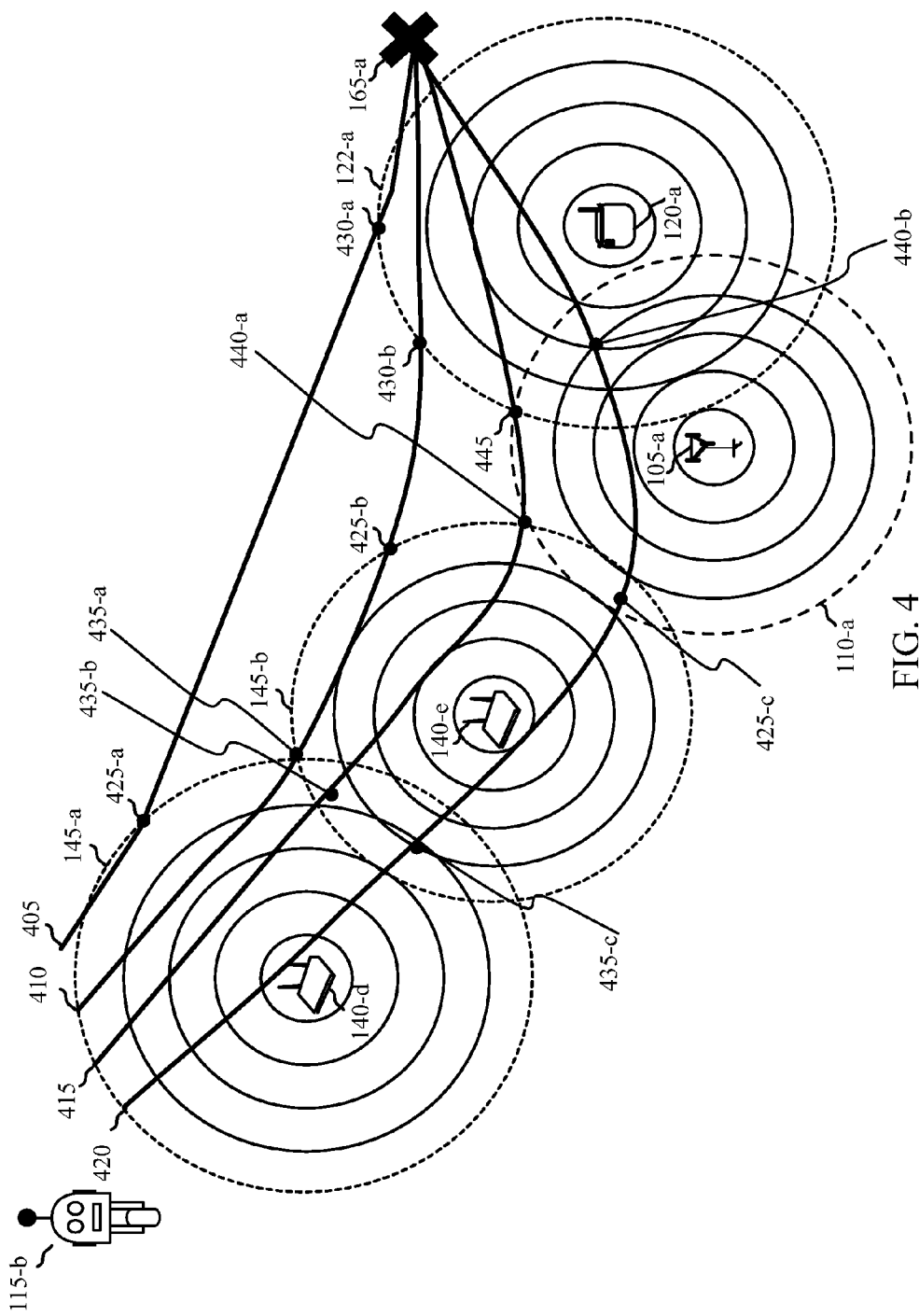
FIG. 4 shows a plan view of a set of available robot navigation paths and access point switching plans for the signal quality map of FIG. 2.
Figure 5:
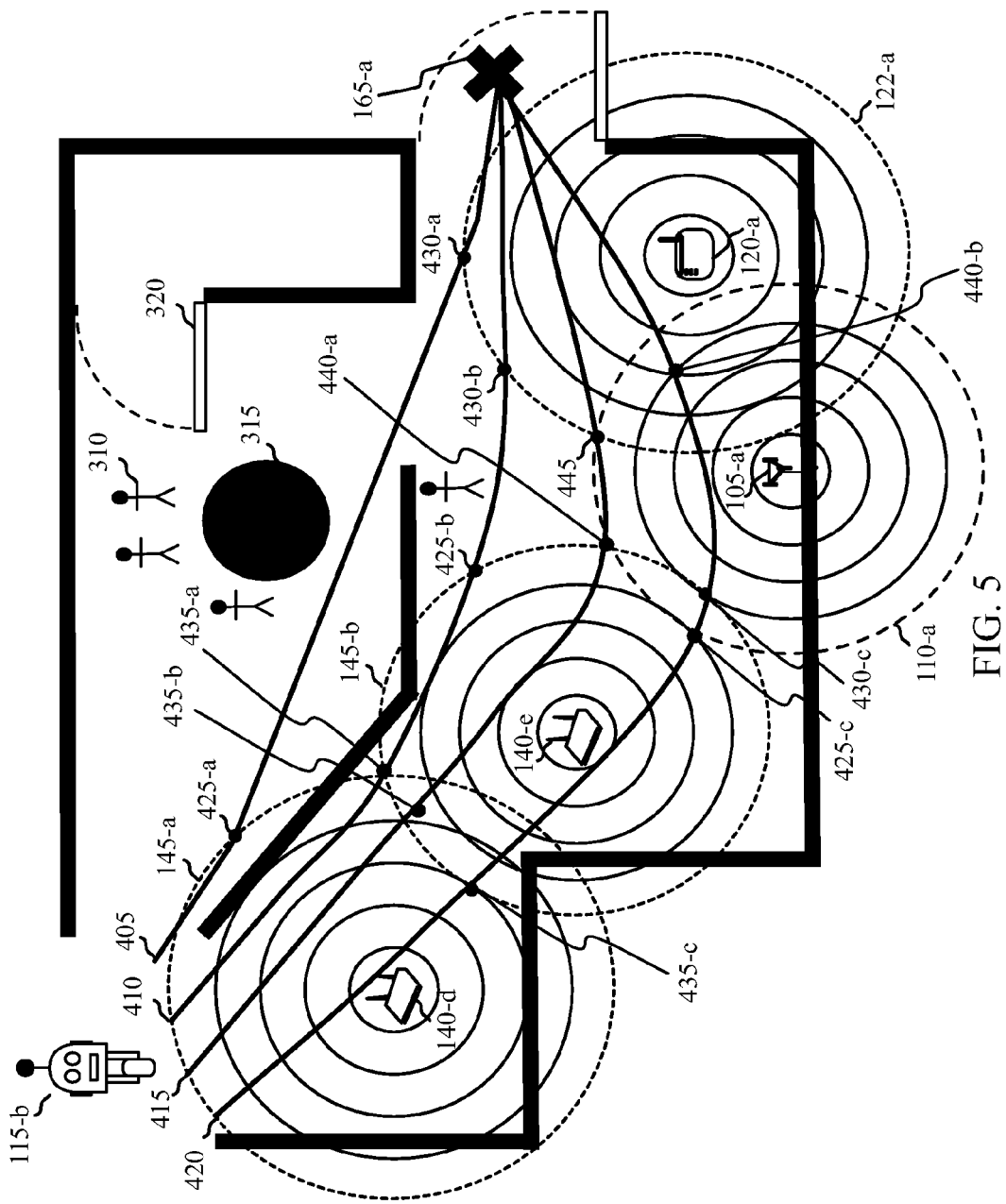
FIG. 5 shows a plan view aligning the signal quality map of FIG. 2, the robot navigation map of FIG. 3, and the available robot navigation paths and access point switching plans of FIG. 4.

Referring now to FIG. 4 and FIG. 5, in some embodiments, robot navigation maps and signal quality maps are associated or aligned such that path plans and access point switching plans may take into account multiple factors such as distance, signal quality, access point switching costs, and so on. Access point switching costs may include costs such as, for example, usage costs associated with different radio access technologies, switching sequence, switching duration, user preference, and the like. In certain implementations, access point switching costs may be combined with RAT usage costs to determine, at least in part, the total cost of one or more particular paths. In some instances, the robotic device aligns and associates at least a portion of each of two maps, for example, a navigation map (e.g. see FIG. 3) and a signal quality map (e.g. see FIG. 2). The current location of the robotic device may be identified in relation to the aligned or associated maps, and a path can be computed from the current location of the robotic device location to a target location 165. The navigation map provides information relating to physical attributes of the environment such as, for example, the location of obstacles and the available space between obstacles. The signal quality map may provide information for use in determining one or more values to be used in the cost function for each legal motion. In some instances, the obstacle map remains static while the signal quality mapped is revised based on the robotic device detecting updated signal quality data, or receiving updated signal quality data from other robotic devices, remote computer devices, or both.

In some instances, path planning is configured such that regions where signal quality is below a given threshold are avoided in all cases. To the extent that signal quality planning data is accurate, remote operator control may be possible at all times during robotic device operation. In the event all available paths include one or more regions where the signal quality drops below a certain threshold, in some implementations, the robotic device may switch to an autonomous mode of operation, and remote operator control may be disabled. In this autonomous mode, the robot may execute a programmed navigation or recovery operation. In certain cases, notification is provided to the remote operator prior to switching to an autonomous operational mode or during such operation. Additionally, as signal quality decreases, audio and video streams may be temporarily disabled. Upon successfully navigating into a region with signal quality in excess of a minimum signal quality threshold, remote operational control may be returned to the operator, and audio and video streaming may be re-enabled.

In certain instances, if a region is encountered where the signal quality is unexpectedly below the minimum signal quality threshold, the robot may execute one or more programmed recovery operations to attempt to reach to a position where signal quality exceeds of the minimum signal quality threshold. Such recovery operations may include, for example, backtracking to the last position where signal quality was in excess of the minimum signal quality threshold, proceeding to the nearest forward location where a signal quality is expected to be in excess of the minimum signal quality threshold, or proceeding to the next location on the selected path to the target location where a signal quality is expected to be in excess of the minimum signal quality threshold. If a path can be found along which signal quality in excess of the minimum signal quality threshold can be maintained, the robotic device may navigate along that path. Alternatively, as determined by the configured robotic device preferences, the robot may switch to or remain in an autonomous operational mode and proceed based on the selected path plan. In addition, the robotic device may execute a local repair plan, including, for example, updating the signal intensity map and path plan, accounting for the locally changed signal quality.

In some instances, a path planning method calculates the cost of a motion or action as a function of the signal quality as follows:

$$\text{cost(motion)} = \begin{cases} 1 & \text{if signal quality} > \text{threshold} \\ 1 + g(\text{signal quality}) & \text{otherwise} \end{cases} \quad \text{Eq. (1)}$$

The function g(signal quality) may determine the relation between distance and signal quality. If g(signal quality) is small, then a shorter distance may be prioritized over signal quality. If g(signal quality) is large, maintaining a high signal quality may be prioritized over distance considerations. For example, in certain cases, motion incurs no additional cost if the signal quality is above a certain threshold c, which may be represented as $$g(\text{signal quality})=0 \text{ for } x \geq c \quad \text{Eq. (2)}$$

In other instances, where quality is determined to be zero, the cost may still be smaller than infinity such that a path can be planned through a zero signal quality region, such as a WiFi dead zone. This may be desired in cases where no alternative higher signal quality path exists. Setting g(signal quality)=∞ may otherwise have the effect of regarding zero signal quality regions such as, for example, WiFi dead zones, as obstacles through which the robotic device cannot move. An example would be if the robot has traveled to the boundary of Wi-Fi coverage and has no knowledge of coverage beyond the boundary.

$$g(\text{signal quality})<\infty \text{ at 0\% signal strength} \quad \text{Eq. (3)}$$

Further, for the case where 0≤(signal quality)≤c, g(signal quality) decreases as the signal quality increases. This inversely proportional relation may be represented by functions such as, for example, a linear, quadratic, or exponential function, and may be determined, in part, by weighting based on user requirements or the desired degree to which the path planning algorithm incorporates signal quality into its path selection.

Still referring to FIG. 4 and FIG. 5, four available robot-navigable paths are shown 405, 410, 415, 420, each representing different combinations of costs, thresholds, and weighting factors. Each robot navigable path 405, 410, 415, 420 includes an associated access point switching plan. In certain cases, a robotic device **115-*b* utilizes a path planning and access point switching plan algorithm configured to select a path with a high weighting factor for distance, a low weighting factor for signal quality, a low weighting factor for switching costs, and no minimum communication threshold 405. Such a path may tend to favor a shorter distance over a higher signal quality, although if obtaining a communication signal can be achieved without significant increase in total distance traveled, the algorithm may generate a path that achieves a limited degree of network access. Such an algorithm may be useful when applied to a condition where the robotic device 115-*b*** is operating with limited remaining battery power.

For example, path plan and access point switching plan 405 first passes through the lowest quality coverage area sub-region of the WiFi access point **140-*d*. This is not the shortest path to the target location, but it is only a slight departure from the shortest path. The plan intentionally exits available coverage areas at the switching boundary point 425-*a*. In some embodiments, the robotic device 115-*b*, may provide notification to a remote operator that the robotic device will be entering an autonomous operational mode prior to reaching switching boundary 425-*a*. At switching boundary 425-*a*, the robotic device 115-*b* may disconnect from access point 140-*d* and enter an autonomous operational mode. This mode may persist until the robotic device 115-*b* reaches the next switching point 430-*a*. Based upon the robot navigation map, the robotic device 115-*b* may determine that there are no obstructions between the first and second switching boundaries 425-*a*, 430-*a*, and may therefore proceed in a straight line. Upon reaching the next switching boundary, the robotic device 115-*b* may initiate a connection with the small cell 120-*a*. In some instances, small cell 120-*a* and access point 140-*d*** may utilize different radio access technologies with different associated usage costs.

In some instances, a robotic device **115-*b* may utilize a path planning and access point switching plan algorithm configured to select a path with a high weighting factor for distance, a moderate weighting factor for signal quality, a moderate weighting factor for switching costs, and no minimum communication threshold 410**. Such a path may tend to slightly favor a shorter distance over a higher signal quality, obtaining a communication signal even when doing so measurably increases the total distance travelled. The algorithm may generate a path that achieves a moderate degree of network access.

For example, path plan and access point switching plan 410 first passes through the mid-quality coverage area sub-region of the WiFi access point **140-*d*. This is not the shortest path to the target location, but it is a slightly larger departure from the shortest path as compared to path plan and access point switching plan 405. The plan does not intentionally exit available coverage areas until doing so is required in order to avoid a significant increase to the total distance. The first switching boundary 435-*a* occurs at the overlap of the low-quality coverage area sub-regions of WiFi access points 140-*d* and 140-*e*. At this switching boundary 435-*a*, the robotic device 115-*b* disconnects from WiFi access point 140-*d* and connects to WiFi access point 140-*e*. The robotic device 115-*b* continues on a relatively straight path towards the next switching boundary 425-*b*** with only a slight curve towards an area of greater signal quality.

The plan intentionally exits available coverage areas at the switching boundary **425-*b*. In some embodiments, the robotic device 115-*b*, may provide notification to a remote operator that the robotic device will be entering an autonomous operational mode prior to reaching switching boundary 425-*b*. At switching boundary 425-*b*, the robotic device 115-*b* may disconnect from access point 140-*e* and enter an autonomous operational mode. This mode may persist until the robotic device 115-*b* reaches the next switching boundary 430-*b*. Based upon the robot navigation map, the robotic device 115-*b* may determine that there are no obstructions between the second and third switching boundaries 425-*b*, 430-*b*, and may therefore proceed in a relatively straight line. Upon reaching the next switching boundary 430-*b*, the robotic device 115-*b* may initiate a connection with the small cell 120-*a*. In some instances, small cell 120-*a* and access point 140-*d*** may utilize different radio access technologies with different associated usage costs.

In some instances, a robotic device **115-*b* may utilize a path planning and access point switching plan algorithm configured to select a path with a high weighting factor for distance, a moderate weighting factor for signal quality, a moderate weighting factor for switching costs, and a low minimum communication threshold 415**. Such a path may tend to slightly favor a shorter distance over a higher signal quality, but may deviate dramatically from the shortest path in order to avoid falling below a minimum communication threshold. The algorithm may generate a path that achieves a continual network access.

For example, path plan and access point switching plan 415 first passes through the high-quality coverage area sub-region of the WiFi access point **140-*d*. This is not the shortest path to the target location, but it is a significant departure from the shortest path as compared to the path plan and access point switching plan 405 and 410. The plan as shown does not intentionally exit available coverage areas even though there is a significant increase in the total distance. The first switching boundary 435-*b* occurs at the overlap of the low quality coverage area sub-regions of WiFi access points 140-*d* and 140-*e*. This switching boundary 435-*b* is located such that the signal quality remains above the minimum communication threshold. At this switching boundary 435-*b*, the robotic device 115-*b* disconnects from WiFi access point 140-*d* and connects to WiFi access point 140-*e*. The robotic device 115-*b* continues on a relatively straight path towards the next switching boundary 440-*a***, maintaining a high signal quality at the expense of increasing the total distance traveled on the path to the target location.

The second switching boundary **440-*a* occurs at the overlap of the low quality coverage area sub-regions of WiFi access points 140-*e* and base station 105-*a*. This switching boundary 440-*a* is located such that the signal quality remains just above the minimum communication threshold. In this example, the radio access technology associated with base station 105-*a* has a high usage cost. Given the moderate weighting factor for switching costs, the path plan and access point switching plans may be harmonized such that the amount of time connected to the radio access technology associated with base station 105-*a* is minimized. At the earliest opportunity 445, the robotic device 115-*a* may disconnect from the base station 105-*a* and connect to the small cell 120-*a*. The plan as shown does not intentionally exit available coverage areas. In some instances, small cell 120-*a* and base station 105-*a*** may utilize the same radio access technologies with the same associated usage costs.

In some instances, a robotic device **115-*b* may utilize a path planning and access point switching plan algorithm configured to select a path with a low weighting factor for distance, a high weighting factor for signal quality, a low weighting factor for switching costs, and a high minimum communication threshold 420**. Such a path may tend to favor higher signal quality at the expense of distance and switching costs, and may deviate dramatically from the shortest path in order to remain above the high communication threshold. The algorithm may generate a path that achieves a constant level of network access with a high signal quality.

For example, path plan and access point switching plan 420 first passes through the highest-quality coverage area sub-region of the WiFi access point 140-*d*. This is a significant departure from the other example path plans and access point switching plans 405, 410, 415. The plan as shown does not intentionally exit available coverage areas even though there is a significant increase in the total distance. The first switching boundary 435-*c* occurs at the overlap of the low quality coverage area sub-regions of WiFi access points 140-*d* and 140-*e*. The switching boundary 435-*c* represents a switching plan that attempts to maintain the highest possible signal quality at all times. At this switching boundary 435-*c*, the robotic device 115-*b* disconnects from WiFi access point 140-*d* and connects to WiFi access point 140-*e*. The robotic device 115-*b* continues on a relatively straight path towards the next switching boundary 425-*c*, maintaining a high signal quality at the expense of increasing the total distance traveled on the path to the target location.

The second switching boundary 425-*c* occurs at the overlap of the low quality coverage area sub-regions of WiFi access points 140-*e* and base station 105-*a*. This switching boundary 425-*c* is located such that the signal quality remains high. While the switching boundary 430-*c* maintains a similar signal quality level, switching at this boundary is closer to a location where connectivity may be lost, suggesting that selection of the earlier switching boundary 425-*c* may reduce the risk of a lost connection. In this example, the radio access technology associated with base station 105-*a* has a high usage cost. Given the low weighting factor for switching costs, the path plan and access point switching plan may be harmonized such that the amount of time connected to the radio access technology associated with base station 105-*a* is not prioritized over maintaining a high signal quality. The next switching boundary 440-*b* represents the boundary point between base station 105-*a* and small cell 120-*a* where signal quality is maintained at a high level. At this boundary 440-*b*, the robotic device 115-*a* disconnects from the base station 105-*a* and connects to the small cell 120-*a*. In some instances, small cell 120-*a* and base station 105-*a* may utilize different radio access technologies with the dissimilar usage costs.

Figure 6:
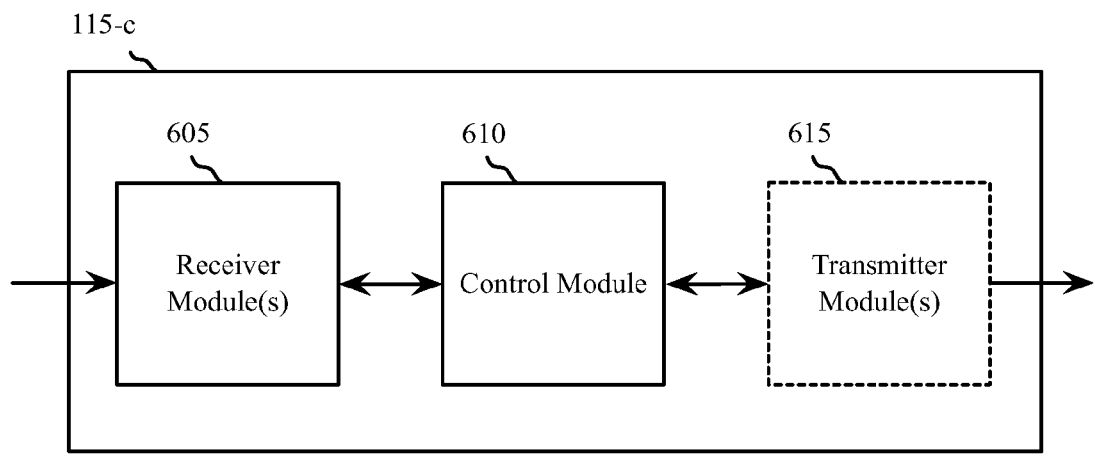
FIG. 6 shows a block diagram of an example of a robotic device.

Referring now to FIG. 6, a block diagram 600 illustrates a robotic device 115-*c* capable of evaluating signal quality metrics, and determining path plans and access point switching plans, in accordance with various embodiments. The robotic device 115-*c* may be an example of one or more aspects of one of the robotic devices 115 described with reference to FIG. 1, 2, 3, 5, or 6. The robotic device 115-*c* may include one or more receiver modules 605, a controller module 610, and one or more optional transmitter modules 615. Each of these components may be in communication with each other.

The components of the mobile device 115-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 605 may include a cellular receiver, which in some cases may include an LTE/LTE-A receiver. The cellular receiver may be used to receive various types of data and/or control signals (i.e., transmissions) over one or more communication channels of a wireless communications system, such as the wireless communications system 100 shown in FIG. 1. The receiver module 605 may further include a wireless local area network (WLAN) receiver. The WLAN receiver may also be used to receive various types of data and/or control signals. In some embodiments, the robotic device 115-*c* is equipped with at least two receiver modules 605 with at least one receiver module configured to maintain a persistent connection to one or more access points for purposes of receiving data transmissions, and at least one receiver module configured to scan for available access points, detect signal quality, or both for use in determining path plans, determining access point switching plans, updating signal quality maps, assessing map accuracy, and the like.

The controller module 610 may perform various functions. In some embodiments, the controller module 610 may operate or control the receiver module 605 to receive operational commands, navigation maps, signal quality maps, and the like. The controller module 610 may also determine RAT availability, network availability and access, bandwidth availability, signal quality, and the like. The controller module 610 may further generate and update signal quality maps, allocate and associate costs with available paths, and select path plans and access point switching plans.

The optional transmitter module 615 may include a cellular transmitter, and in some cases may include an LTE/LTE-A transmitter. The optional transmitter module 615 may also or alternately include a WLAN transmitter. The optional transmitter module 615 may be used to transmit various types of data or control signals over one or more communication channels of a wireless communications system, such as the wireless communications system 100.

Figure 7:
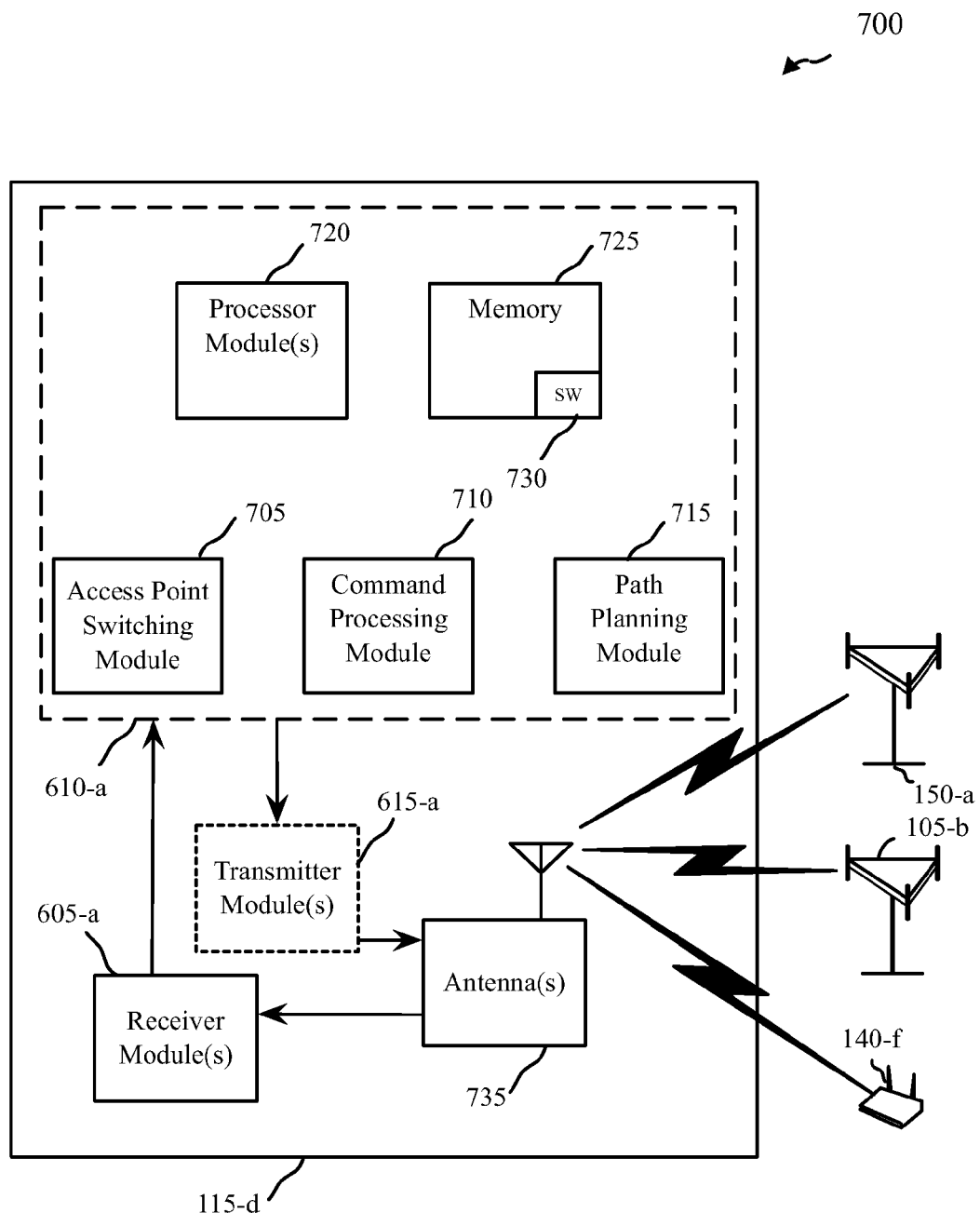
FIG. 7 shows an example of a wireless communications system and block diagram of an example of a robotic device.

With reference now to FIG. 7, an exemplary robotic device 700 is illustrated in accordance with various embodiments, and may be an example of a system that forms at least a part of the system 100 of FIG. 1. System 700 includes a robotic device 115-*d* that may communicate with base station 105-*b*, other WWAN access node 150-*a*, and/or WiFi/WLAN access node 140-*f* to receive access to one or more wireless networks. Robotic device 115-*d* may be an example of a robotic device 115 of FIG. 1, 2, 3, 5, or 6. Robotic device 115-*d*, includes one or more antenna(s) 735 communicatively coupled to receiver module(s) 605-*a* and optional transmitter module(s) 615-*a*, which are in turn communicatively coupled to a control module 610-*a*. Control module 610-*a* includes one or more processor module(s) 720, a memory 725 that may include software 730, an access point switching module 705, a command processing module 710, and a path planning module 715. The software 730 may be for execution by processor module 720, access point switching module 705, command processing module 710, or path planning module 715.

The processor module(s) 720 may include an intelligent hardware device, e.g., a central processing unit (CPU), a microcontroller, an application specific integrated circuit (ASIC), etc. The memory 725 may include random access memory (RAM) and read-only memory (ROM). The memory 725 may store computer-readable, computer-executable software code 730 containing instructions that are configured to, when executed (or when compiled and executed), cause the processor module 720, access point switching module 705, command processing module 710, or path planning module 715 to perform various functions described herein (e.g., bandwidth determination, cost allocation, network access determination, switching plan selection, etc.). The access point switching module 705, command processing module 710, or path planning module 715 may be implemented as a part of the processor module(s) 720, or may be implemented using one or more separate CPUs or ASICs, for example. The optional transmitter module(s) 615-a may transmit to base station 105-c, WWAN access points 150-c, and WiFi/WLAN access points 140-f (and/or other base stations) to establish communications with one or more wireless communications networks (e.g., E-UTRAN, UTRAN, etc.), as described above. The access point switching module 705 may be configured to control occurrence of connect and disconnect events of one or more available RATs, based at least in part on commands received from the command processing module 710, the path planning module 715, or both, in order to guide establishing communication with one of the multiple available access nodes 105-b, 150-a, and 140-f. The command processing module 710 may be configured to receive robotic device control commands from remote computing devices. The path planning module 715, as will be described in more detail below, may be configured to perform various data acquisition activities, condition detections, and condition evaluations in support of selecting a path plan and an access point switching plan for the robotic device 115-d. The receiver module(s) 605-a may receive downlink transmissions from base station 105-b (and/or other base stations), such as described above. Downlink transmissions are received and processed at the robotic device 115-d. The components of robotic device 115-d may, individually or collectively, be implemented with one or more Application Specific Integrated Circuits (ASICs) adapted to perform some or all of the applicable functions in hardware. Each of the noted modules may be a means for performing one or more functions related to operation of the robotic device 115-d.

Figure 8:
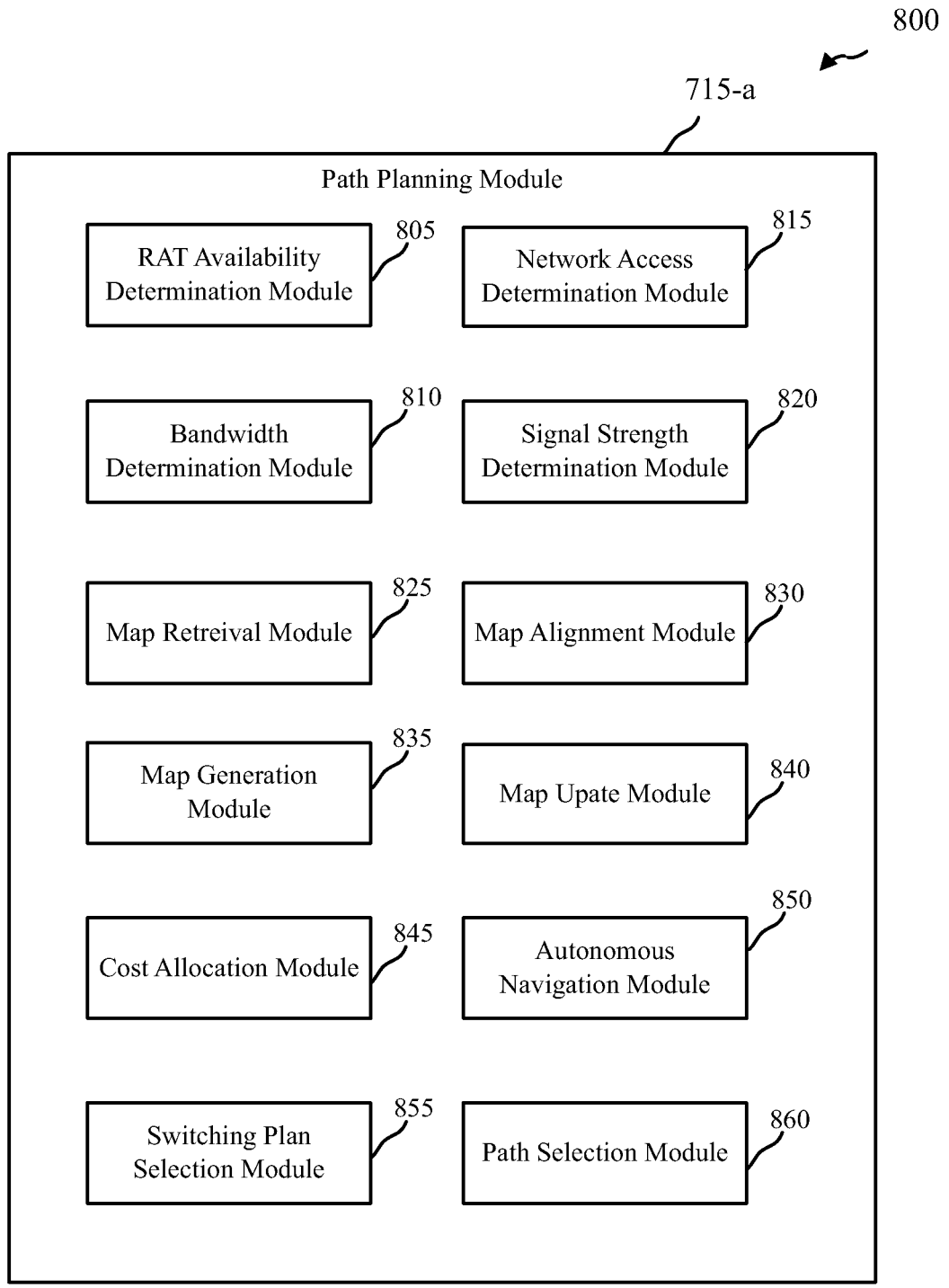
FIG. 8 shows a block diagram of an example of a path planning module.

Referring now to FIG. 8, a block diagram 800 illustrates an example of the path planning module 715-a capable of determining a path plan and a access point switching plan in accordance with various embodiments. The path planning module 615-a may be an example of the path planning module 715 described with reference to FIG. 7 and may include one or more modules such as a RAT identification module 805, a network access determination module 815, a bandwidth determination module 810, a signal strength determination module 820, a map retrieval module 825, a map alignment module 830, a map generation module 835, a map update module 840, a cost allocation module 845, an autonomous navigation module 850, a switching plan selection module 855, and a path selection module 860.

In some embodiments, the modules included in the path planning module perform various functions relating to path planning and selection. The RAT availability determination module 805 may determine whether one or more RATs included on a path plan or in an access point switching plan are available to the robotic device. For example, during path selection, the RAT availability determination module 805 may analyze whether the robotic device includes a transmitter module 615 or a receiver module 605 (e.g. See FIG. 6 and FIG. 7) compatible with one or more RATs identified in a signal quality map. In addition, during navigation, the RAT availability determination module 805 may determine in almost real-time which RATs are available and provide indication to the map update module 840 that a map may be inaccurate. The network access determination module 815 may perform functions similar to the RAT availability determination module 805, but with such functions directed towards network access rather than RAT availability. Multiple networks analyzed for access may use the same RAT or different RATs.

In certain instances, the path planning module 715-a includes modules directed towards assessing attributes related to signal quality. For example, in some cases, a bandwidth determination module 810 may be included that determines the estimated bandwidth, the historical bandwidth, or both during the path planning and access point switching planning process. In the case of path planning, the bandwidth determination may indicate that a particular path fails to adhere to a minimum bandwidth threshold, and as a consequence, direct the cost allocation module 845 to significantly increase the cost allocated to that path. In some implementations, the bandwidth determination module 810 may also determine other attributes relating to data transmission, such as data transfer limits. Similarly, the signal strength determination module 820 may assess the signal intensity for a given access point. This assessment may be based upon, for example, an assessment of a signal intensity map, real-time detection of signal availability and intensity by a receiver module 605 (e.g., See FIG. 6 and FIG. 7), or both.

In certain implementations, a robotic device may be configured to use multiple signal quality thresholds. For example, an algorithm and operational configuration may include both a minimum bandwidth threshold and a minimum signal intensity threshold. Different behaviors may be associated or triggered by approaching or falling below each minimum threshold. In some instances, when a signal falls below minimum bandwidth threshold, certain data intensive actions may be deprioritized to increase the probability that critical remote operator control operations are maintained. When a signal intensity level approaches a minimum signal intensity threshold, the robotic device may transmit a warning to a remote operator, slow forward movement, or both. If the robotic device is unexpectedly exposed to a signal intensity level below the minimum signal intensity threshold, the robotic device may switch to an autonomous mode without attempting to transmit any warning messages.

In some embodiments, a series of modules relating to map reference and map manipulation are provided. A map retrieval module 825 may access a local map, request a map from a remote computing device, or obtain a map from another robotic device. Map types may include, for example, a robot navigation map, a signal quality map, a topographical map, and so on. A map alignment module 830 may determine the location of the robotic device in relation to the robot navigation map. In addition, map alignment module 830 may associate or align one or more maps such that the relevant data associated with different types of maps may be correlated with positions on the robot navigation map. For example, a signal quality map may be aligned with a robot navigation map such that access point switching boundaries may be identified as part of determining switching costs for purposes of allocating costs to one or more available paths.

Additional modules with map related functionality may include a map generation module 835 and a map update module 840. The map generation module 835 may generate one or more map types automatically or at the request of the remote operator. For example, the robotic device may navigate an area while the map generation module 835 monitors signal strength, using the result of the monitoring activities to generate a signal intensity map, a RAT availability map, or the like. In some instances, a simultaneous localization and mapping technique is used generate a map within an unknown environment, to update a map within a known environment, or both, while at the same time keeping track of the location of the robotic device.

Similarly, a map update module 840 may collect information about the local environment and update one or more maps when the collected data is inconsistent with the map data. For example, the map update module 840 may update one or more signal quality values for a particular signal quality map where the age of a signal quality value is older than a pre-defined period of time. The value may be updated by, for example, averaging the current signal quality value and the prior quality value to obtain a new signal quality value. In addition, a second longer pre-defined period of time may be implemented such that signal quality values in excess of this second pre-defined period of time are replaced by a more current measurement rather than averaged. Alternatively, and in addition, the age of the signal quality map itself may be assessed in relation to a pre-defined period of time such that a new map is generated, retrieved, or both.

In some embodiments, a cost allocation module 845 allocates various costs to different variables in one or more cost functions used as part of a path determination algorithm, an access point switching path determination algorithm, or both. The cost allocation operation may include a variety of functions including one or more weighting functions, threshold condition tests, user preference factors robotic device demand factors, and the like. In some instances, the access point switching plan is determined in conjunction with path plan determination such that costs associated with possible access point switching plans are fed back into the path plan selection algorithm as a part of the total cost calculation for the path plan.

In certain cases, the path planning module 715-*a* is configured to support intentional entry into areas where signal quality is below a minimum communication threshold. In such cases, the path planning module 715-*a* may include an autonomous navigation module 850 configured to direct the robotic device through such an area according to a defined navigation model. For example, the navigation model may include proceeding to a next location on the selected path in the direction of the target location where a signal quality is expected to be in excess of the minimum signal quality threshold.

In some embodiments, the path planning module 715-*a* includes a switching plan selection module 855 and a path selection module 860. Functionality relating to these modules is discussed in detail throughout this specification. In some instances, the access point switching plan is determined in conjunction with path plan selection. In some cases, the determination and selection of the access point switching plan occurs independently of path plan selection. For example, in certain cases, a switching plan may be evaluated when an unexpected signal condition arises without re-evaluation of the selected path plan.

Figure 9:
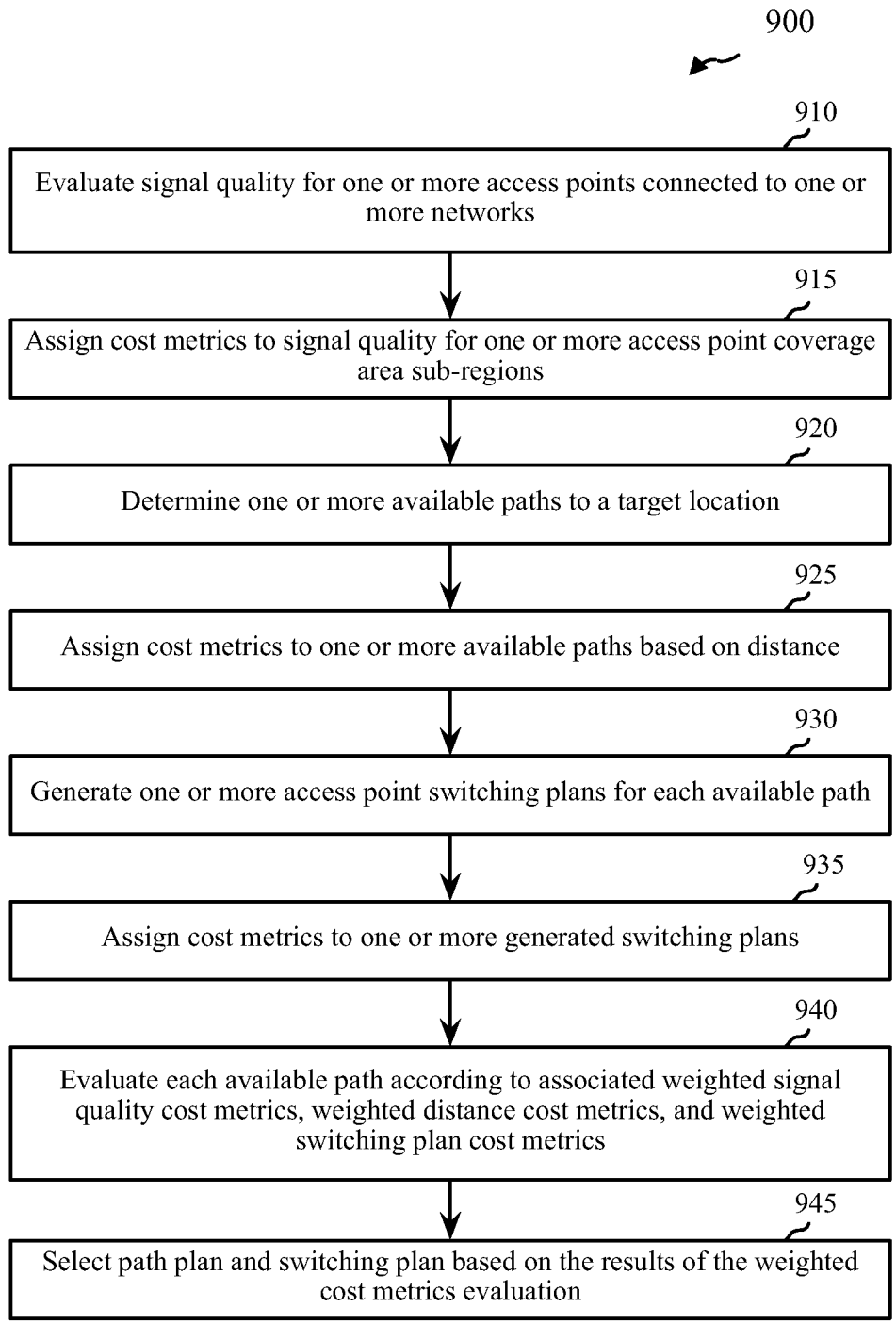
FIG. 9 is a flowchart of a method for evaluating signal quality metrics, determining a path to a target location, and determining an access point switching plan.

FIG. 9 illustrates a method 900 that may be carried out by a robotic device in a wireless communications system according to various embodiments. The method 900 may, for example, be performed by a robotic device of FIG. 1, 2, 3, 5, or 6, or using any combination of the devices described for these figures. Initially, at block 910 the robotic device evaluates signal quality metrics for one or more access points connected to one or more networks. This evaluation may include an evaluation of signal quality data as it is represented on an existing signal quality map. In certain instances, the signal quality map includes signal quality data for various sub-regions for one or more access point coverage areas included on the signal quality map. At block 915, cost metrics may be assigned to signal quality for one or more access point coverage area sub-regions according to the appropriate cost allocation algorithm. At block 920 and 925, one or more available paths from the initial location to the target location may be obtained. More specifically, one or more available paths to a target location may be determined and cost metrics may be assigned to one or more available paths based on distance. In some instances, a robot navigation map may be used to determine available paths. An initial cost allocation based exclusively on the distance of the available path may be assigned. At block 930 and 935, one or more access point switching plans may be generated for one or more of the available paths. In some embodiments, switching plans are generated in conjunction with the generation of the path plans. Cost metrics may be assigned to one or more generated switching plans. In some instances, switching costs may be allocated to the individual switching events, as well as to the switching plans. At block 940 and 945, each available path may be evaluated according to associated weighted signal quality cost metrics, weighted distance cost metrics, and weighted switching plan cost metrics. A path plan and associated access point switching plan may then be selected based on the results of the weighted cost metrics evaluation. In some implementations, the evaluation includes performing a cost comparison function reflecting such factors as user preferences, one or more minimum threshold levels, map accuracy, and the like.

Figure 10:
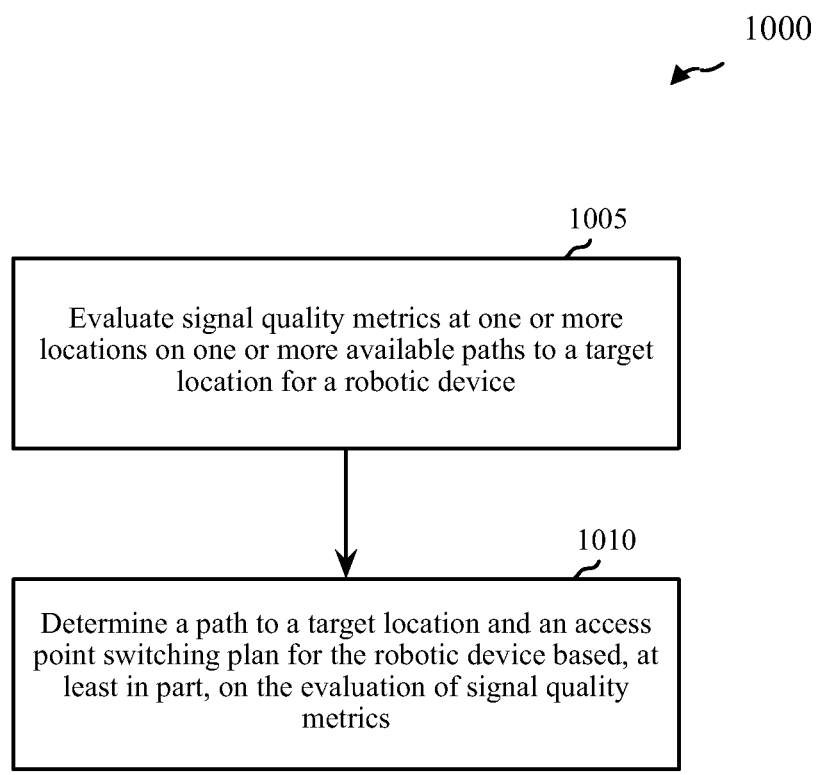
FIG. 10 is a flowchart of another method for evaluating signal quality metrics, determining a path to a target location, and determining an access point switching plan.

Turning to FIG. 10, a flowchart illustrating a method 1000 for evaluating signal quality metrics, determining a path to a target location, and determining an access point switching plan is shown in accordance with various embodiments. The method 1000 may be carried out by a robotic device in a wireless communications system and may, for example, be performed by a robotic device of FIG. 1, 4, 5, 6, or 7, or using any combination of the devices described for these figures. Initially, at block 1005, the robotic device may evaluate signal quality metrics at one or more locations on one or more available paths to a target location. Signal quality metrics may include various metrics relating to one or more attributes associated with a wireless signal, such as signal intensity, signal reliability, estimated bandwidth, historical bandwidth, data upload rate, data download rate, and the like. In some embodiments, one or more signal quality metric evaluation algorithms may be configured by the operator of the robotic device. In some other embodiments, one or more signal quality metric evaluation algorithms may be determined, in part, by robotic device operational demands. At block 1010, the robotic device may determine a path to a target location and an access point switching plan based, at least in part, on the evaluation of the signal quality metrics. In certain instances, the evaluation of signal quality metrics uses cost-based path planning algorithms well known in the art such as the A* algorithm.

Figure 11A:
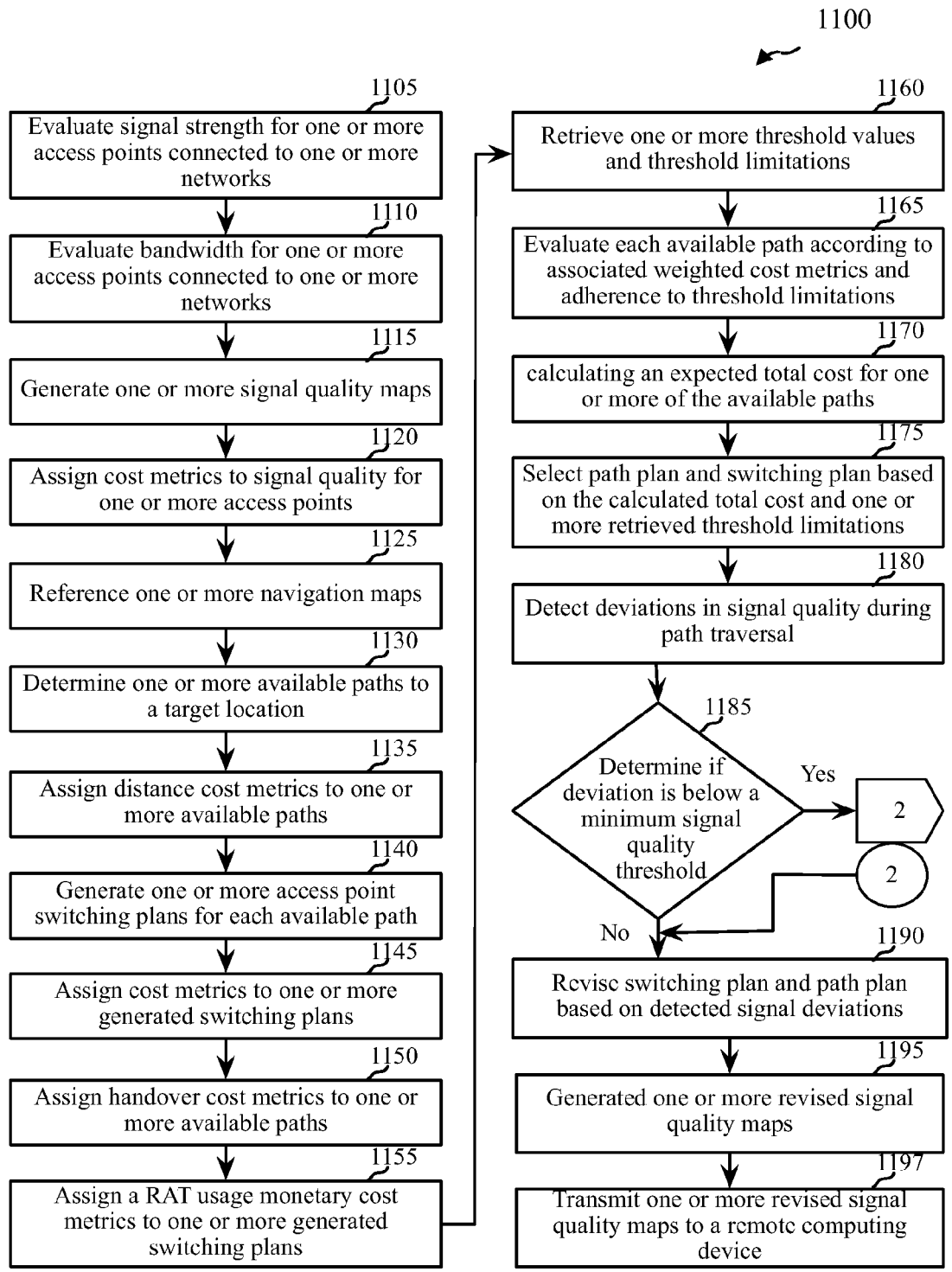
FIG. 11A is a flowchart of another method for evaluating signal quality metrics, determining a path to a target location, and determining an access point switching plan.

FIG. 11A illustrates a method 1100 that may be carried out by a robotic device in a wireless communications system according to various embodiments. The method 1100 may, for example, be performed by a robotic device of FIG. 1, 2, 3, 5, or 6, or using any combination of the devices described for these figures. Initially, at block 1105 and 1110 the robotic device may evaluate signal strength and bandwidth for one or more access points connected to one or more networks. In some instances, evaluating signal strength, bandwidth, or both includes evaluating existing maps, maps or data received from other robotic devices, or data collected by sensors on the robotic device. At block 1115, one or more signal quality maps may be generated by the robotic device. Maps may be generated based on a variety of data sources and methods such as, for example, generation from raw signal quality data, generation from aggregated signal quality data, generation by combining signal quality data with an existing map, and generation by combining, associating, and aligning multiple maps. At block 1120, cost metrics may be assigned to one or more access points on one or more signal quality maps in accordance with methods previously described. At block 1125, the robotic device may reference one or more navigation maps. At blocks 1130, 1135, 1140, and 1145, distance cost metrics and switching plan cost metrics may be determined, generated, and assigned according to method 900 as described in FIG. 9. In addition, at blocks 1150 and 1155, handover cost metrics may be assigned to one or more of the available paths, and RAT usage monetary cost metrics may be assigned to one or more generated switching plans. In some embodiments, RAT usage fees associated with multiple RATs are compared when determining access point switching plans, path plans, or both.

At block 1160, one or more threshold values, threshold limitations, or both may be retrieved from memory. A threshold may include a minimum value below which an assigned cost is significantly increased. A threshold limitation may include a threshold minimum value where the path planning algorithm will not intentionally select a path that anticipates a minimum threshold violation. For example, in some embodiments, signal quality metrics associated with one or more locations are compared to one or more signal quality thresholds to determine, at least in part, if a minimum threshold violation may occur.

Blocks 1165, 1170, and 1175, make up an example of a path plan and switching plan selection algorithm. In this example, each path may be evaluated according to associated weighted cost metrics and adherence to threshold limitations. In some instances, user preferences are factored into the evaluation. The expected total cost for one or more available paths may be calculated. In some instances, the calculation includes comparing the expected total costs. A path plan and switching plan may be selected based on the calculated total cost and one or more retrieved threshold limitations. More specifically, in some cases, the selection may be based on identifying the lowest cost path that adheres to the associated threshold limitations.

At blocks 1180 and 1185, signal quality deviations may be detected by the robotic device during path traversal, such as when it navigates along the selected path. These deviations may be compared against a minimum signal quality threshold to determine if they should be processed as significant deviations. If the robotic device detects deviations below the minimum signal quality threshold, the robotic device may execute conditional logic for handling significant deviations.

Figure 11B:
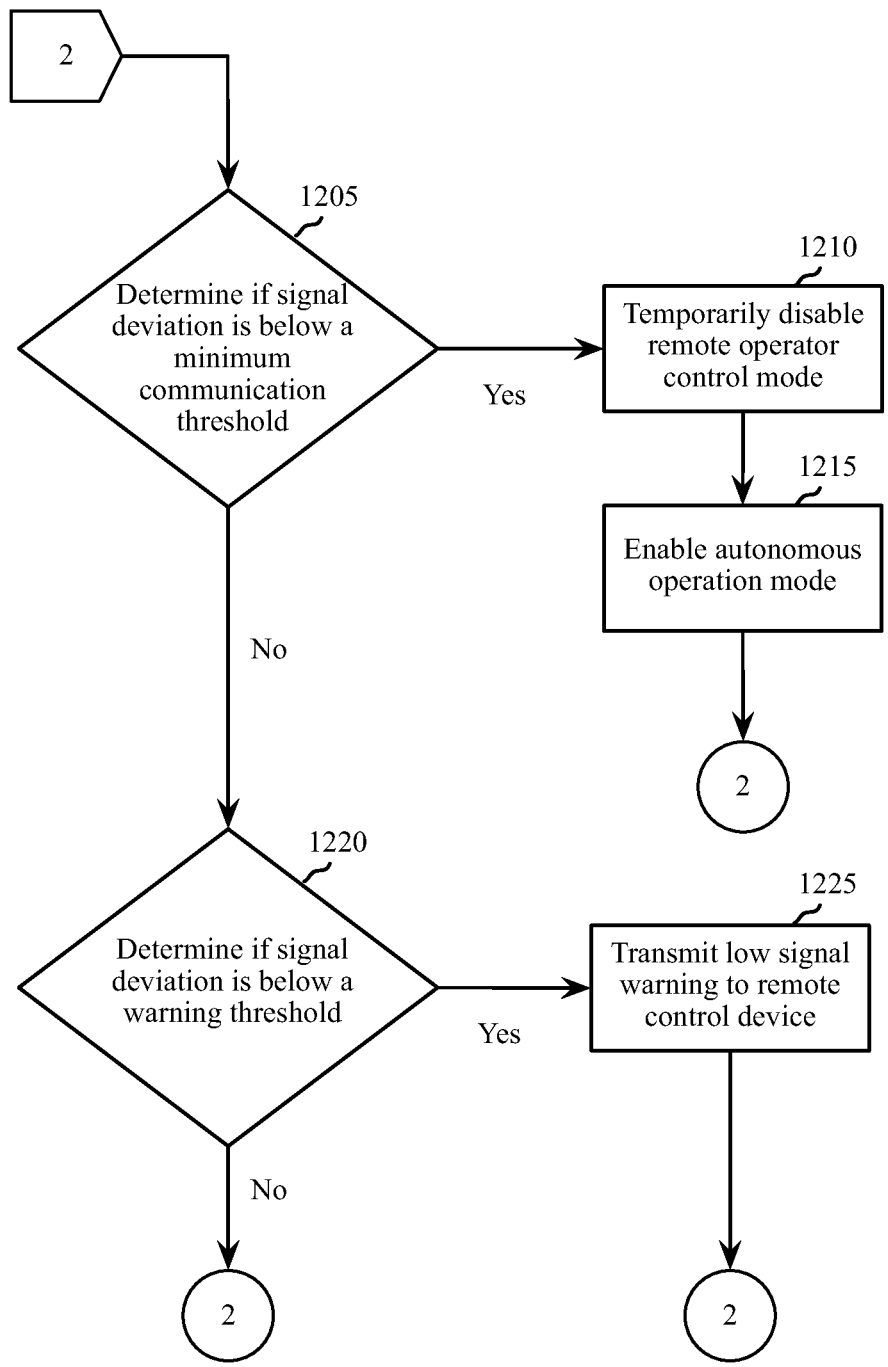
FIG. 11B is a flowchart of an example of an optional low signal detection and autonomous mode switching algorithm for the evaluation and determining method of FIG. 10.

Referring now to FIG. 11B, conditional deviation handling logic may include determining if the signal deviation is below a minimum communication threshold such that communication with the operator, and therefore possibly control by the operator, may be at risk. If it is determined that the signal deviation is below the minimum communication threshold 1205, then the remote operator control mode may be temporarily disabled 1210 and the autonomous mode enabled 1215. If the detected signal deviation is not below a minimum communication threshold, then the signal deviation may be compared against a warning threshold 1220. If it is determined that the signal deviation is below the warning threshold but above the minimum communication threshold, then a low signal warning may be transmitted to the remote control device informing of the signal condition.

Referring again to FIG. 11A, at blocks 1190, 1195, and 1197, the switching plan, path plan, or both may be updated or revised based on the detection of the signal deviation, along with any maps that may be inconsistent with the signal deviation. More specifically, the switching plan and path plan may be revised based on detected signal deviations, and one or more revised signal quality maps may be generated. In some embodiments, one or more of the revised signal maps may be transmitted to a remote computing device such as a server or another robotic device.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer product or computer-readable media both include a computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A path planning method for planning a path of a robotic device, the method comprising:
    utilizing one or more sensors on a robotic device to collect data from one or more access points;
    evaluating, based at least in part on the collected data, signal quality metrics at one or more locations on one or more available paths to a target location for the robotic device;
    evaluating accuracy of one or more signal quality indicators of a signal quality map of the access points; and
    determining a path to the target location and an access point switching plan for the robotic device based, at least in part, on the evaluation of signal quality metrics and accuracy of the one or more signal quality indicators.

2. The path planning method of claim 1 wherein, the access point switching plan comprises one or more switching events at one or more locations wherein one or more switching events comprise:
    disconnecting from a first access point utilizing a first radio access technology (RAT) and connecting to a second access point utilizing a second RAT.

3. The path planning method of claim 1, wherein at least one of determining the path or determining the access point switching plan is based, at least in part, on comparing a cost associated with usage of a first radio access technology (RAT) and a cost associated with usage of a second RAT.

4. The path planning method of claim 1, wherein at least one of determining the path or determining the access point switching plan is based, at least in part, on maintaining a signal quality level in excess of a first minimum signal quality threshold when utilizing a first RAT and maintaining a signal quality level in excess of a second minimum signal quality threshold, different from the first minimum signal quality threshold, when utilizing a second RAT.

5. The path planning method of claim 1, wherein evaluating signal quality metrics comprises comparing signal quality metrics associated with one or more locations to a plurality of signal quality thresholds.

6. The path planning method of claim 1, wherein at least one of determining the path or determining the access point switching plan is based, at least in part, on maintaining a signal quality level in excess of a first minimum signal quality threshold.

7. The path planning method of claim 5, wherein one of the signal quality thresholds comprises a minimum bandwidth threshold.

8. The path planning method of claim 1, wherein determining the path comprises selecting the path with a lowest expected total cost wherein cost is, at least in part, a function of signal quality.

9. The method of claim 1, wherein determining the access point switching plan comprises:
    identifying a first access point, wherein the first access point utilizes a first radio access technology (RAT);
    identifying a first coverage area sub-region for the first access point wherein, an expected first signal quality level for the first access point is below one or more signal quality threshold levels;
    selecting a second coverage area sub-region for a second access point with an expected second signal quality level exceeding one or more signal quality threshold levels wherein the second access point utilizes a second RAT;
    selecting a switching boundary for establishing a connection with the second access point.

10. The path planning method of claim 1 further comprising:
identifying a signal quality level at one or more locations;
generating signal quality metrics based, at least in part, on the identified signal quality level; and
updating the access point switching plan based, at least in part, on the generated signal quality metrics.

11. The path planning method of claim 1 further comprising:
determining a signal quality level for a location on the signal quality map; and
updating the signal quality map with the determined signal quality level.

12. The method of claim 1, wherein determining the path comprises:
identifying a path to the target location having one or more locations with a signal quality level below a minimum signal quality threshold;
assigning a cost less than infinity to the identified locations; and
selecting the path to the target location.

13. The path planning method of claim 1 further comprising:
detecting a signal quality level at one or more locations, wherein the detected signal quality level is different than an expected signal quality level for the one or more locations;
transmitting the detected signal quality level to a remote computing device; and
executing a local repair plan.

14. The path planning method of claim 1, wherein determining the access point switching plan comprises:
referencing at least a portion of a navigation map wherein the navigation map is representative of robot-navigable regions;
referencing at least a portion of a first access point signal quality map representative of one or more first access point signal quality coverage areas;
referencing at least a portion of a second access point signal quality map representative of one or more second access point signal quality coverage areas;
aligning one or more of the first access point signal quality coverage areas and the second access point signal quality coverage areas with at least a portion of the robot-navigable regions on the navigation map; and
identifying one or more access point switching boundaries along the path to the target location.

15. The path planning method of claim 14, wherein one or more of the first signal quality map, second signal quality map, or navigation map are stored on a remote computing device accessible to at least the robotic device.

16. The path planning method of claim 14 wherein, at least one of the first access point signal quality map or the second access point signal quality map are associated with an accuracy value; and
determining the path comprises:
calculating a lowest expected total cost wherein the lowest expected total cost calculation weights a signal quality level as a factor of total cost by converting the accuracy value to a signal quality level weighting factor; and
selecting a path with a lowest expected total cost.

17. A path planning device configured for planning a path of a robotic device, the path planning device comprising:
one or more sensors configured to collect data at a robotic device from one or more access points;
at least one processor configured to:
evaluate, based at least in part on the collected data, signal quality metrics at one or more locations on one or more available paths to a target location for the robotic device;
evaluate accuracy of one or more signal quality indicators of a signal quality map of the access points; and
determine a path to a target location and access point switching plan for the robotic device based, at least in part, on the evaluated signal quality metrics and accuracy of the one or more signal quality indicators.

18. The path planning device of claim 17 wherein, the access point switching plan comprises one or more switching events at one or more switching boundaries wherein one or more switching events comprises a disconnect event from a first access point utilizing a first radio access technology (RAT) and connect event to a second access point utilizing a second RAT.

19. The path planning device of claim 17, wherein for at least one of determining the path to the target location or determining the access point switching plan, the processor is further configured to compare a cost associated with usage of a first radio access technology (RAT) to a cost associated with usage of a second RAT.

20. The path planning device of claim 17, wherein for at least one of determining the path to the target location or determining the access point switching plan, the processor is further configured to maintain a signal quality level in excess of a first minimum signal quality threshold when utilizing a first RAT and maintain a signal quality level in excess of a second minimum signal quality threshold, different from the first minimum signal quality threshold, when utilizing a second RAT.

21. The path planning device of claim 17, wherein for evaluating signal quality metrics, the processor is further configured to compare signal quality metrics associated with one or more locations to a plurality of signal quality thresholds.

22. The path planning device of claim 17, wherein the processor is further configured to:
detect a signal quality level at one or more locations;
generate signal quality metrics based, at least in part, on the detected signal quality; and
update the access point switching plan based, at least in part, on the signal quality metrics.

23. A path planning system, comprising:
means for utilizing one or more sensors on a robotic device to collect data from one or more access points;
means for evaluating, based at least in part on the collected data, signal quality metrics at one or more locations on one or more available paths to a target location for the robotic device;
means for evaluating accuracy of one or more signal quality indicators of a signal quality map of the access points; and
means for determining a path to a target location and an access point switching plan for the robotic device based, at least in part, on the evaluation of signal quality metrics and accuracy of the one or more signal quality indicators.

24. The path planning system of claim 23 wherein, the access point switching plan comprises one or more switching events at one or more boundaries wherein one or more switching events comprise means for disconnecting from a first access point utilizing a first radio access technology (RAT) and means for connecting to a second access point utilizing a second RAT.

25. The path planning system of claim 23, wherein at least one of the means for determining the path to the target location or the means for determining the access point switching plan is based, at least in part, on comparing a cost associated with usage of a first radio access technology (RAT) and a cost associated with usage of a second RAT.

26. The path planning system of claim 23, wherein at least one of the means for determining the path to the target location or the means for determining the access point switching plan is based, at least in part, on maintaining a signal quality level in excess of a first minimum signal quality threshold when utilizing a first radio access technology (RAT) and maintaining a signal quality level in excess of a second minimum signal quality threshold, different from the first minimum signal quality threshold, when utilizing a second RAT.

27. The path planning system of claim 23, wherein the means for evaluating signal quality metrics comprises means for comparing signal quality metrics associated with one or more locations to a plurality of signal quality thresholds.

28. The path planning system of claim 23 further comprising:
- means for detecting a signal quality level at one or more locations;
- means for generating signal quality metrics based, at least in part, on the detected signal quality level; and
- means for updating the access point switching plan based, at least in part, on the signal quality metric.

29. A non-transitory computer-readable medium comprising:
- code for utilizing one or more sensors on a robotic device to collect data from one or more access points;
- code for evaluating signal quality metrics at one or more locations on one or more available paths to a target location for the robotic device;
- code for evaluate accuracy of one or more signal quality indicators of a signal quality map of the access points; and
- code for determining a path to a target location and access point switching plan for the robotic device based, at least in part, on the evaluation of signal quality metrics and accuracy of the one or more signal quality indicators.

* * * * *